(12) United States Patent
Hinckley et al.

(10) Patent No.: US 7,256,770 B2
(45) Date of Patent: *Aug. 14, 2007

(54) METHOD FOR DISPLAYING INFORMATION RESPONSIVE TO SENSING A PHYSICAL PRESENCE PROXIMATE TO A COMPUTER INPUT DEVICE

(75) Inventors: Kenneth P. Hinckley, Seattle, WA (US); Steven N. Bathiche, Redmond, WA (US); William Vong, Seattle, WA (US); James H. Cauthorn, Seattle, WA (US); Corey M. Ladas, Bellevue, WA (US); Kenneth V. Fry, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 338 days.

This patent is subject to a terminal disclaimer.

(21) Appl. No.: 09/804,496

(22) Filed: Mar. 13, 2001

(65) Prior Publication Data

US 2001/0015718 A1   Aug. 23, 2001

Related U.S. Application Data

(63) Continuation-in-part of application No. 09/152,434, filed on Sep. 14, 1998, now Pat. No. 6,456,275, and a continuation-in-part of application No. 09/152,432, filed on Sep. 14, 1998, now abandoned, and a continuation-in-part of application No. 09/152,443, filed on Sep. 14, 1998, now Pat. No. 6,396,477, and a continuation-in-part of application No. 09/200,325, filed on Nov. 25, 1998, now Pat. No. 6,333,753, application No. 09/804,496, which is a continuation-in-part of application No. 09/200,321, filed on Nov. 25, 1998, now Pat. No. 6,232,957.

(60) Provisional application No. 60/100,261, filed on Sep. 14, 1998.

(51) Int. Cl.
*G06F 3/041* (2006.01)
*G09G 5/00* (2006.01)

(52) U.S. Cl. .................... 345/173; 345/156

(58) Field of Classification Search .............. 345/87, 345/336, 156–183, 440; 715/704, 716, 727, 715/728, 715, 779, 812, 738–752, 711, 803
See application file for complete search history.

(56) References Cited

U.S. PATENT DOCUMENTS 4,028,695 A    6/1977  Saich (Continued)

FOREIGN PATENT DOCUMENTS

JP    10-091307 A    4/1998

OTHER PUBLICATIONS

R. Balakrishnan et al., "The PadMouse: Facilitating Selection and Spatial Positioning for the Non-Dominant Hand", Proceedings of CHI '98, Los Angeles, California, Apr. 18-23, 1998, pp. 9-16.

(Continued)

*Primary Examiner*—Kevin M Nguyen
(74) *Attorney, Agent, or Firm*—Banner & Witcoff, Ltd.

(57) ABSTRACT

In a computer system, a touch sensitive input device having touch sensitive auxiliary controls system can be used to anticipate a user's action. When a user's hand approaches a touch sensitive input device, feedback can be displayed on a display screen. A user can receive feedback without activating the input device. The feedback may take the form of status information related to the feature controlled by the input device and can vary depending upon the application open. Likewise, when the hand of a user is moved away from the touch sensitive input device, the feedback brought on by sensing the user's hand may disappear.

16 Claims, 27 Drawing Sheets

U.S. PATENT DOCUMENTS

| | | | |
|---|---|---|---|
| 4,317,956 A | 3/1982 | Torok et al. | |
| 4,403,777 A | 9/1983 | Del Principe et al. | |
| 4,977,397 A | 12/1990 | Kuo et al. | |
| 5,208,903 A | 5/1993 | Curry | |
| 5,250,929 A | 10/1993 | Hoffman et al. | |
| 5,252,951 A * | 10/1993 | Tannenbaum et al. | 345/156 |
| 5,309,172 A | 5/1994 | Fox | |
| 5,311,175 A | 5/1994 | Waldman | |
| 5,347,295 A * | 9/1994 | Agulnick et al. | 345/156 |
| 5,355,148 A | 10/1994 | Anderson | |
| 5,426,450 A | 6/1995 | Drumm | |
| 5,457,480 A | 10/1995 | White | |
| 5,530,455 A | 6/1996 | Gillick et al. | |
| 5,559,301 A | 9/1996 | Bryan, Jr. et al. | |
| 5,572,238 A | 11/1996 | Krivacic | |
| 5,589,855 A | 12/1996 | Blumstein et al. | |
| 5,598,527 A | 1/1997 | Debrus et al. | |
| 5,635,958 A * | 6/1997 | Murai et al. | 345/168 |
| 5,666,113 A | 9/1997 | Logan | |
| 5,666,499 A | 9/1997 | Baudel et al. | |
| 5,675,361 A | 10/1997 | Santilli | |
| 5,694,153 A | 12/1997 | Aoyagi et al. | |
| 5,698,822 A | 12/1997 | Haneda et al. | |
| 5,751,260 A | 5/1998 | Nappi et al. | |
| 5,752,254 A * | 5/1998 | Sakairi | 715/530 |
| 5,767,457 A | 6/1998 | Gerpheide et al. | |
| 5,793,356 A | 8/1998 | Svancarek et al. | |
| 5,798,752 A | 8/1998 | Buxton et al. | |
| 5,805,144 A | 9/1998 | Scholder et al. | |
| 5,812,114 A | 9/1998 | Loop | |
| 5,818,800 A | 10/1998 | Barker | |
| 5,825,356 A | 10/1998 | Habib et al. | |
| 5,828,360 A | 10/1998 | Anderson et al. | |
| 5,831,597 A * | 11/1998 | West et al. | 345/163 |
| 5,841,425 A | 11/1998 | Zenz, Sr. | |
| 5,844,547 A | 12/1998 | Minakuchii et al. | |
| 5,847,695 A | 12/1998 | Duncan et al. | |
| 5,854,624 A | 12/1998 | Grant | |
| 5,877,750 A | 3/1999 | Hanson | |
| 5,905,493 A | 5/1999 | Belzer et al. | |
| 5,907,327 A * | 5/1999 | Ogura et al. | 715/764 |
| 5,910,798 A | 6/1999 | Kim | |
| 5,910,800 A | 6/1999 | Shields et al. | |
| 5,910,802 A | 6/1999 | Shields et al. | |
| 5,914,702 A | 6/1999 | Derocher et al. | |
| 5,914,707 A | 6/1999 | Kono | |
| 5,943,052 A | 8/1999 | Allen et al. | |
| 5,973,622 A | 10/1999 | Chiang | |
| 5,973,670 A | 10/1999 | Barber et al. | |
| 5,977,952 A | 11/1999 | Francis | |
| 5,982,302 A | 11/1999 | Ure | |
| 5,983,245 A * | 11/1999 | Newman et al. | 715/513 |
| 5,995,101 A * | 11/1999 | Clark et al. | 345/711 |
| 6,005,496 A | 12/1999 | Hargreaves et al. | |
| 6,016,520 A | 1/2000 | Facq et al. | |
| 6,020,881 A | 2/2000 | Naughton et al. | |
| 6,040,817 A * | 3/2000 | Sumikawa | 715/788 |
| 6,040,821 A | 3/2000 | Franz et al. | |
| 6,046,728 A | 4/2000 | Hume et al. | |
| 6,097,371 A | 8/2000 | Siddiqui et al. | |
| 6,100,875 A | 8/2000 | Goodman et al. | |
| 6,118,450 A * | 9/2000 | Proehl et al. | 715/810 |
| 6,121,960 A | 9/2000 | Carroll et al. | |
| 6,133,916 A * | 10/2000 | Bukszar et al. | 715/744 |
| 6,166,723 A | 12/2000 | Schena et al. | |
| 6,232,968 B1 * | 5/2001 | Alimpich et al. | 715/744 |
| 6,246,405 B1 | 6/2001 | Johnson | |
| 6,262,717 B1 | 7/2001 | Donohue et al. | |
| 6,323,846 B1 | 11/2001 | Westerman et al. | |
| 6,346,951 B1 * | 2/2002 | Mastronardi | 715/716 |
| 6,489,974 B1 * | 12/2002 | Johnson et al. | 715/772 |
| 6,680,677 B1 | 1/2004 | Tiphane | |
| 6,686,911 B1 * | 2/2004 | Levin et al. | 345/184 |
| 6,710,771 B1 * | 3/2004 | Yamaguchi et al. | 345/184 |

OTHER PUBLICATIONS

"The Design of a GUI Paradigm based on Tablets, Two-hands and Transparency", Proceedings of Computer-Human Interaction (CHI) 1997, Atlanta, Georgia, Mar. 22-27, 1997, pp. 35-42.

K. Fishkin et al., "Enhanced Dynamic Queries via Movable Filters", Proceedings of CHI 1995 Conference, pp. 415-420 (as downloaded from http://www.parc.xerox.com/istl/projects/MagicLenses/DynamicQueries.html on Sep. 25, 1998, pp. 1-13).

E. A. Bier et al., "A Taxonomy of See-through Tools", Proceedings of CHI 1994 Conferences, Apr. 1994, Boston, Massachusetts, pp. 517-523.

M.C. Stone et al., "The Movable Filter as a User Interface Tool" Proceedings of CHI 1994 Conference, Apr. 1994, Boston, Massachusetts, pp. 306-312 (as downloaded from http://www.parc.xerox.com/istl/projects/MagicLenses/94CHIFilters.html on Sep. 24, 1998, pp. 1-15).

E.A. Bier et al. "Toolglass and Magic Lenses: The See-Through Interface", Proceedings of the Annual Conference on Computer Graphics SIGGRAPH 93, Anaheim, California, Aug. 1-6 1993, pp. 73-80.

W. Buxton et al., "A Study in Two-Handed Input", Proceedings of CHI '86, Boston, Massachusetts, Apr. 13-17 1986, pp. 321-326.

B. Buxton, "Integrating the Periphery and Context: A New Taxonomy of Telematics", Computer Systems Research Institute (CSRI, University of Toronto & Alias Research Inc., pp. 1-10, downloaded on Mar. 23, 1999 from: http://www.dgp.toronto.edu/people/rroom/research/papers/bg_fg/bg_fg.html.

W. Buxton, "Living in Augmented Reality: Ubiquitous Media and Reactive Environments", Computer Systems Research Institute, University of Toronto and Alias/Wavefront Inc., pp. 1-17, downloaded on Feb. 1, 1999 from: http//www.dgp.utoronto.ca/OTP/papers/bill.buxton/augmentedReality.html.

W. Buxton et al., "A Microcomputer-based Conducting System", Computer Music Journal, vol. 4, No. 1, Spring 1980, contents and pp. 8-21.

Thomas G. Zimmerman et al., "Applying Electric Field Sensing to Human-Computer Interfaces," CHI '95 Mosaic of Creativity, May 7-11, 1995, pp. 280-287.

J.R. Smith, "Field Mice: Extracting Hand Geometry From Electric Field Measurements," IBM Systems Journal, vol. 35, Nos. 3 & 4, 1996, pp. 587-608.

Joshua Smith et al., "Electric Field Sensing for Graphical Interfaces, "MIT Media Laboratory—Special Issue on Input Devices, IEEE Computer Graphics and Applications, May 1998.

Beverly L. Harrison et al., "Squeeze Me, Hold Me, Tilt Me! An Exploration of Manipulative User Interfaces," CHI 98, Apr. 18-23, 1998, pp. 17-24.

Buxton, W., Hill, R., Rowley, P., "Issues and Techniques in Touch-Sensitive Tablet Input, " Computer Graphics, 19(3): pp. 215-224, 1985.

Herot, C., Weinzapfel, G., "One-Point Touch Input of Vector Information from Computer Displays," Computer Graphics, 12(3): pp. 210-216, 1978.

Rouse, P., "Touch-Sensitive joystick," Radio & Electronics World, Fe. 1985, pp. 23-26.

Microsoft Windows User's Guide, 1992, Doc. No. PC21669-0492.

Using Windows NT Workstation 4, 2nd Ed., 1998 QUE.

Ken Hinckley et al., "Interaction and Modeling Techniques for Desktop Two-Handed Input," Proceedings of ACM UIT'98 Symposium on User Interface Software and Technology, pp. 49-58.

Ken Hinckley and Mike Sinclair, "Touch-Sensing Input Devices," To Appear in ACM CHI'99 Conf. On Human Factors in computing Systems.

Albrecht Schmidt, "Implicit Human Computer Interaction Through Context," Telecooperation Office (TecO), University of Karlsruhe Germany.

"Personal Computer Environmental Control Via a Proximity Sensor," IBM Technical Disclosure Bulletin, vol. 36, No. 08, Aug. 1993.

J. Mackinlay et al., "A Semantic Analysis of the Design Space of Input Devices", Human-Computer Interaction, vol. 5, 1991, pp. 145-190.

S. Card et al. "A Morphological Analysis of the Design Space of Input Devices", ACM Transactions on Information Systems, vol. 9, No. 2, Apr. 1991, pp. 99-122.

W. Buxton et al., "A three-state model of graphical input", Proceedings of INTERACT -90, Amsterdam, Netherladns, 1990, pp. 449-456.

Computer Music Journal, vol. 4, No. 1, Spring 1980.

B. Buxton, "Integrating the Periphery and Context: A New Taxonomy of Telematics," *Computer Systems Research Institute (CSRI), University of Toronto & Alias Research Inc.*, pp. 1-10, downloaded on Mar. 23, 1999 from http://www.dgp.toronto.edu/people/rroom/research/papers/bg_fg/bg_fg.html.

Computer Music Journal, vol. 4, No. 1, Spring 1980.

EP Search Report dtd Dec. 29, 2006, EP Pat. Appln. 02 005 645.

* cited by examiner

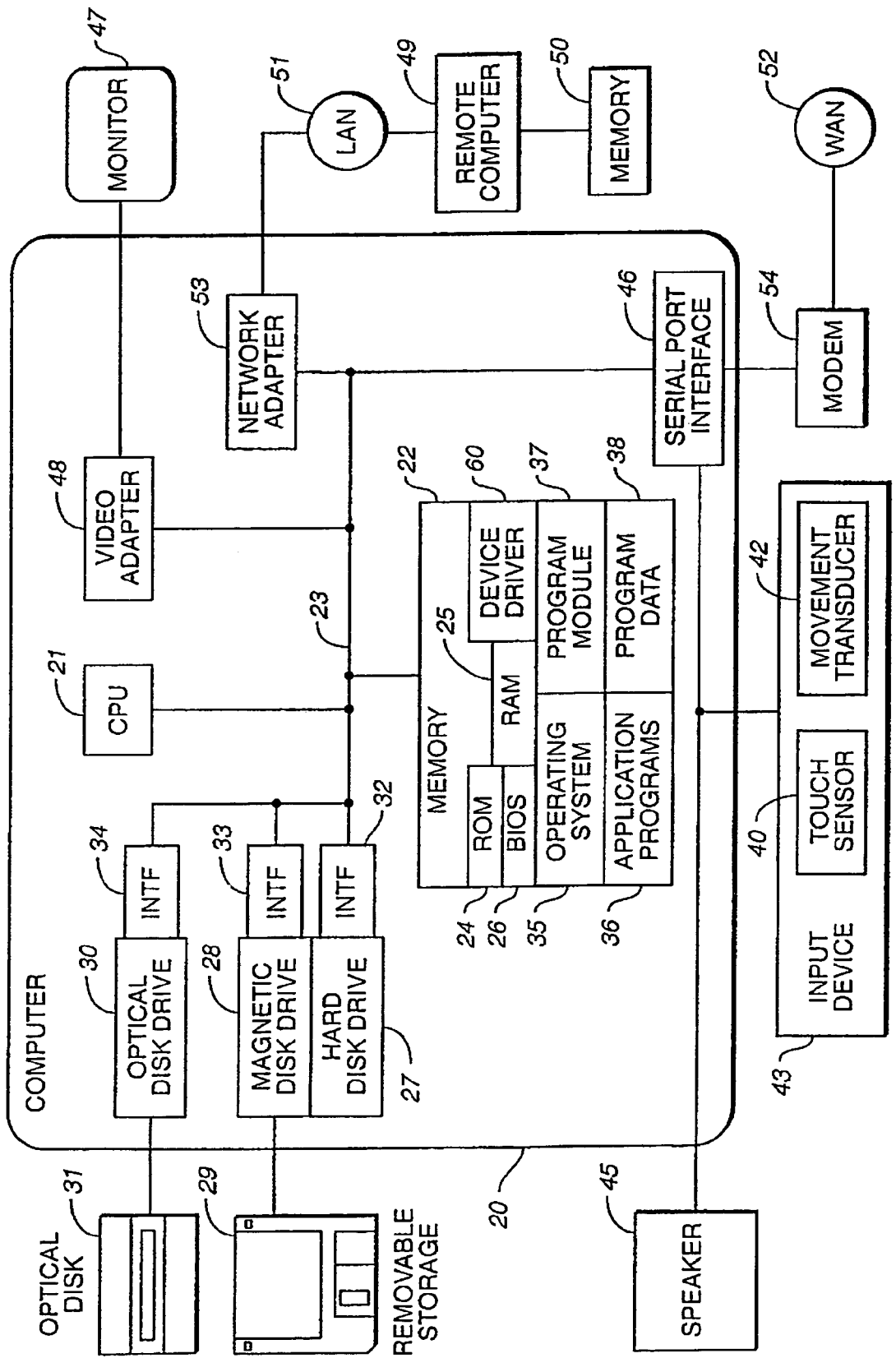
FIG._1

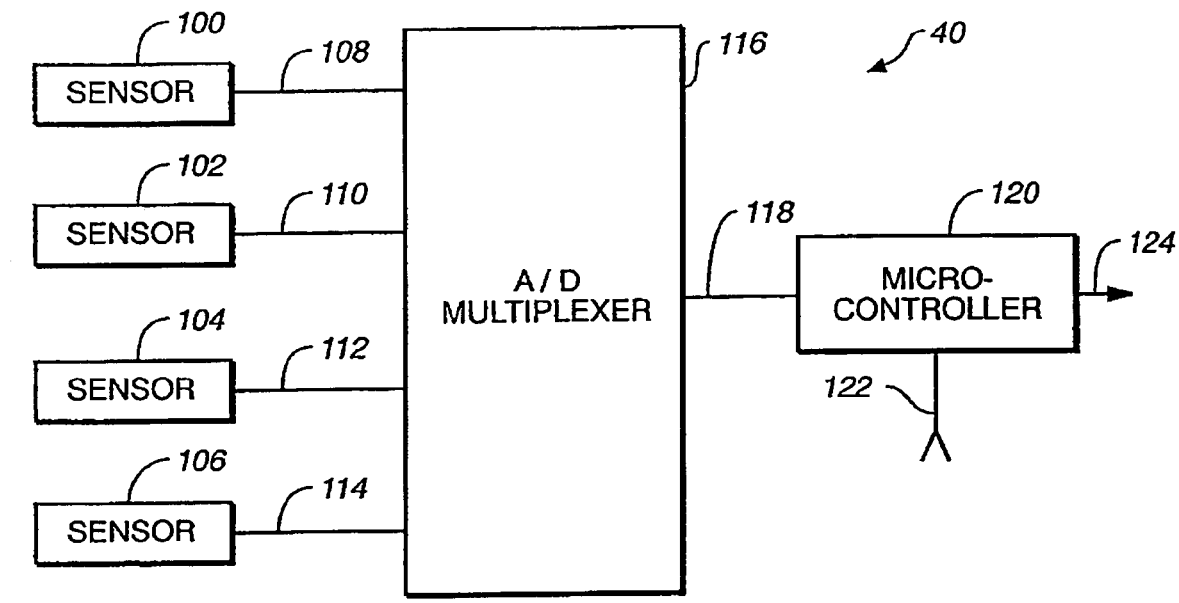
FIG._2
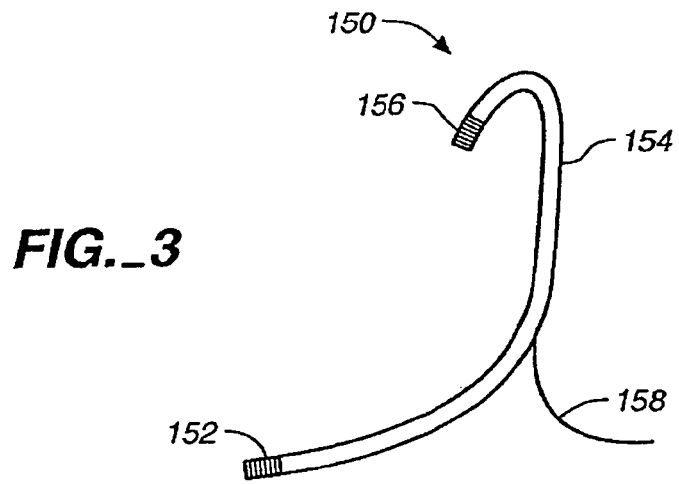
FIG._3

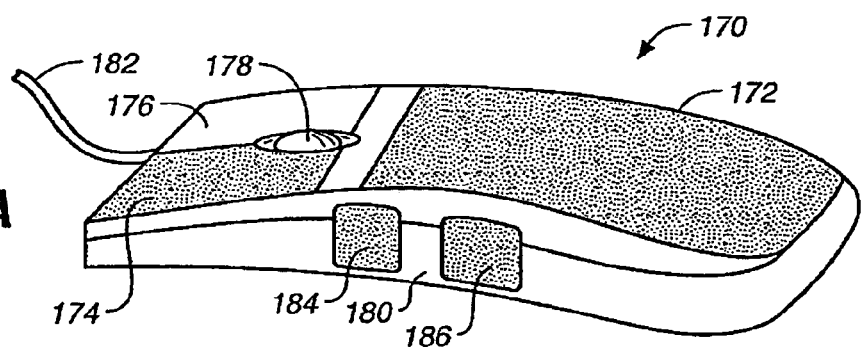
FIG._4A
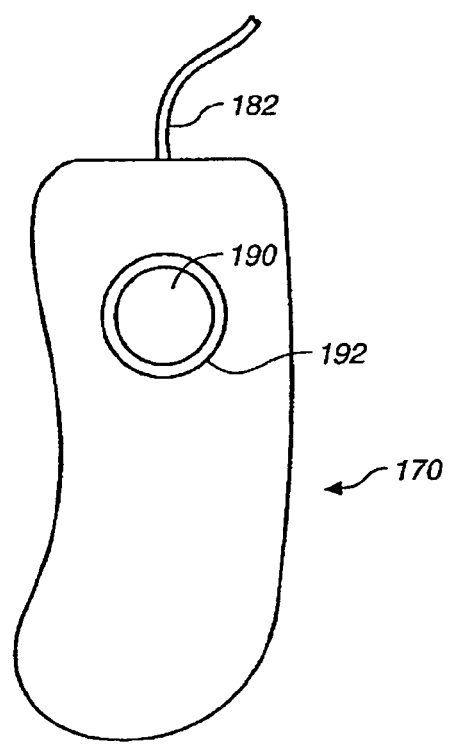
FIG._4B
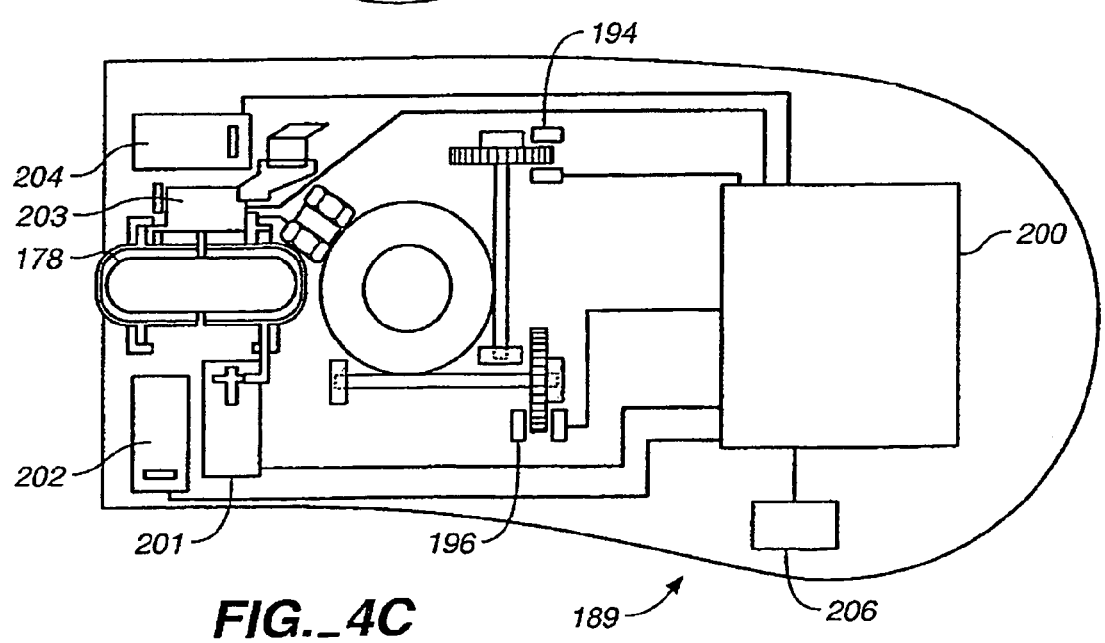
FIG._4C

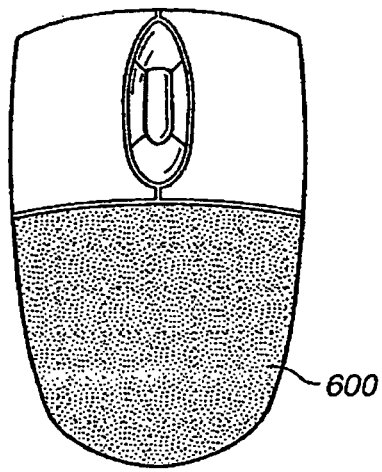
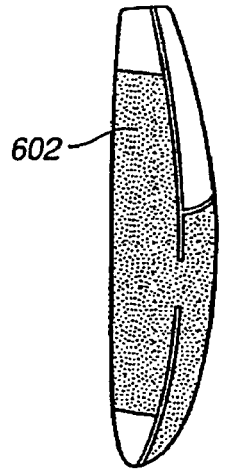
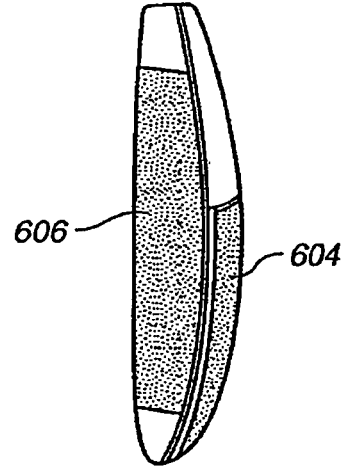
FIG._5     FIG._6A     FIG._6B
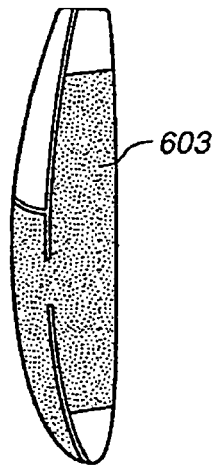
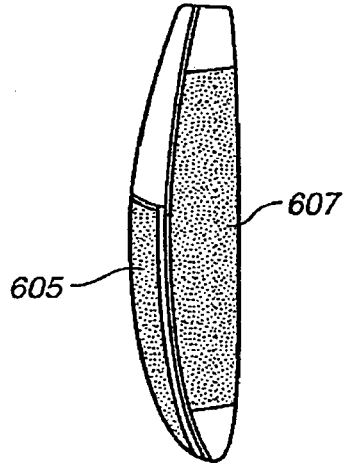
FIG._6C     FIG._6D

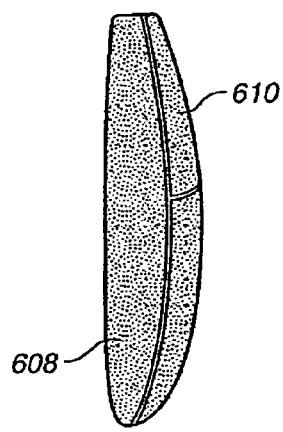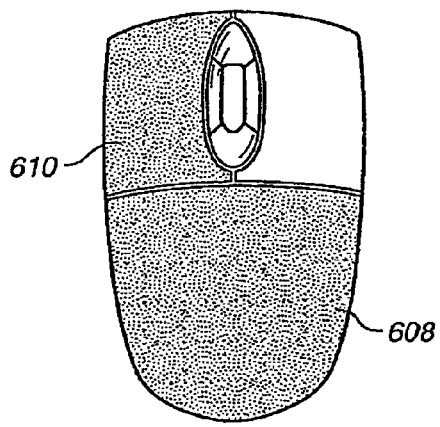
FIG._7A  FIG._7B
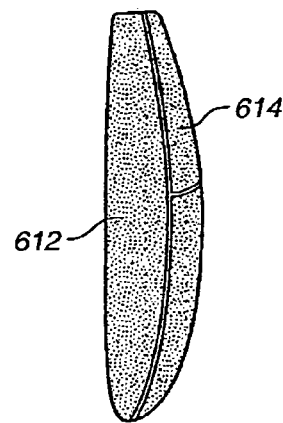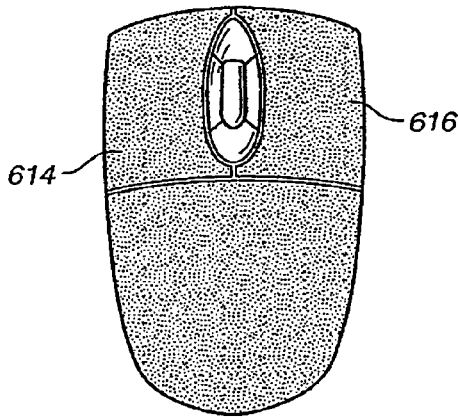
FIG._8A  FIG._8B
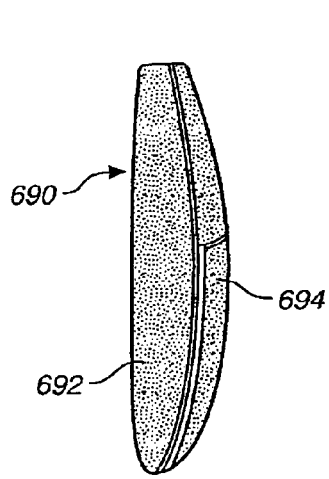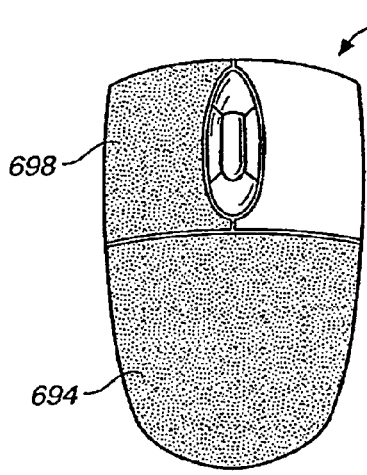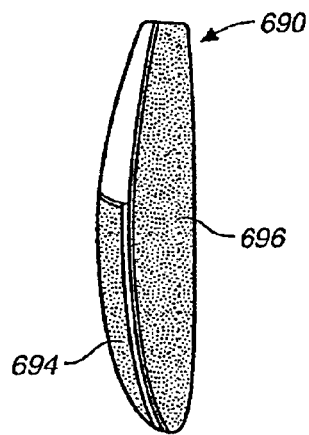
FIG._9A  FIG._9B  FIG._9C

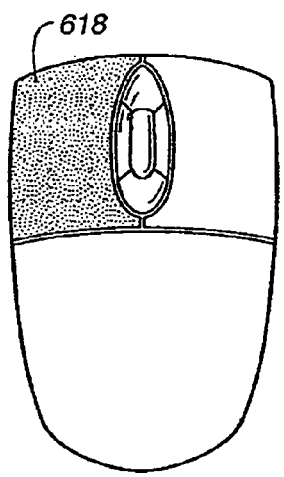
FIG._10A
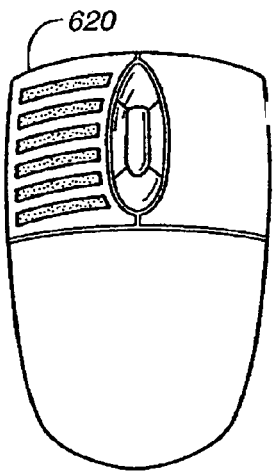
FIG._10B
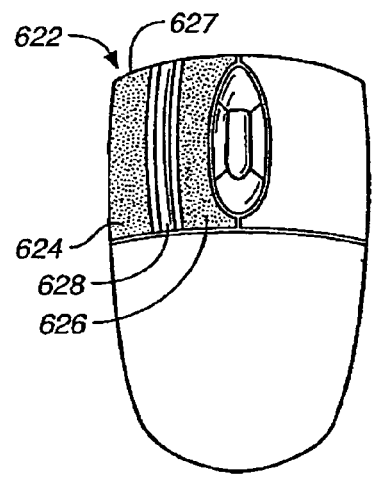
FIG._10C
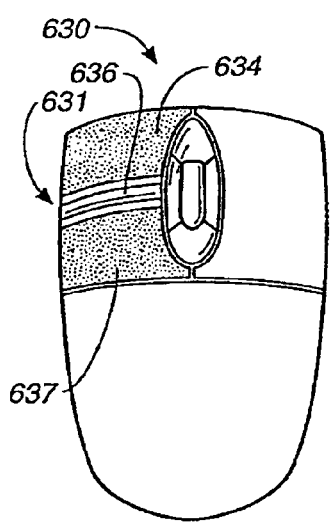
FIG._10D
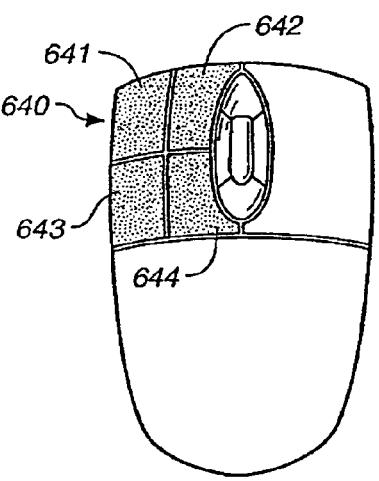
FIG._10E
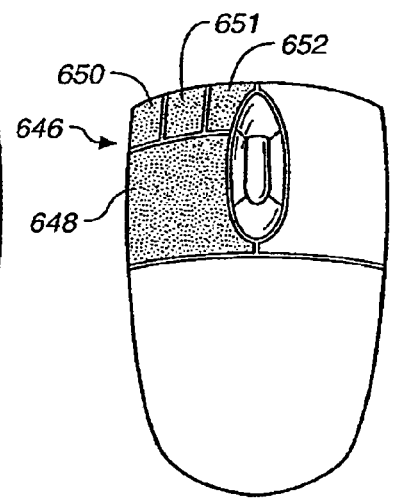
FIG._10F

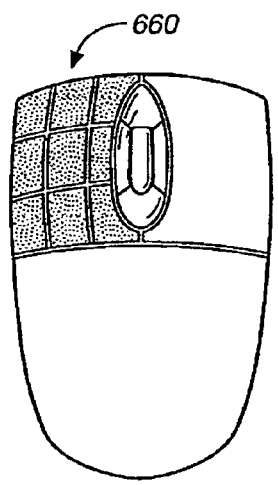
*FIG._10G*
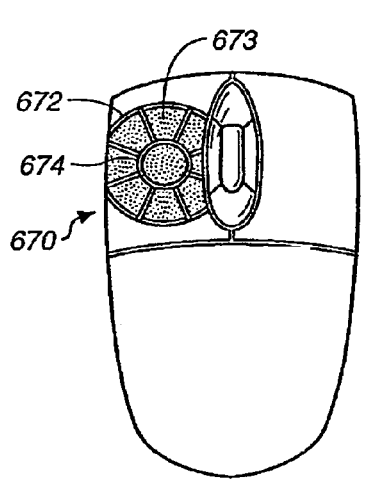
*FIG._10H*
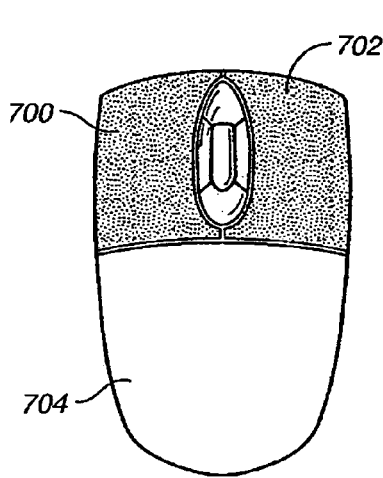
*FIG._11A*
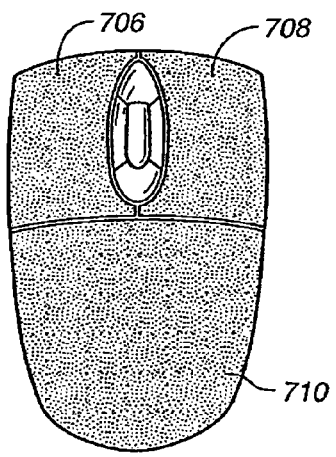
*FIG._11B*
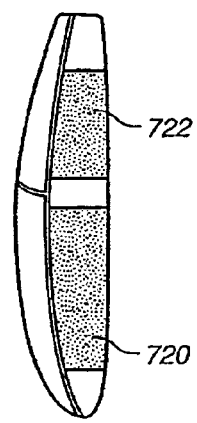
*FIG._12A*
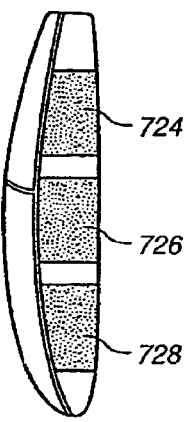
*FIG._12B*

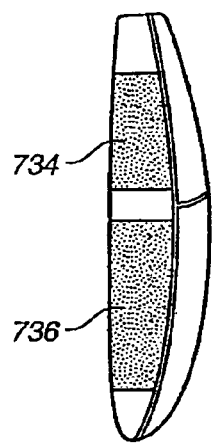 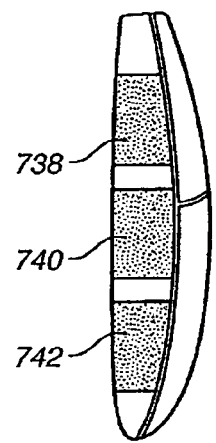 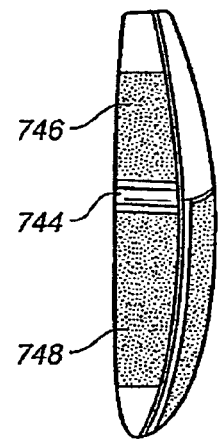 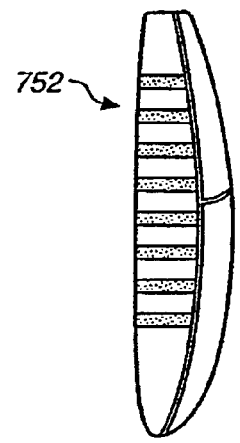
FIG._13A  FIG._13B  FIG._13C  FIG._13D
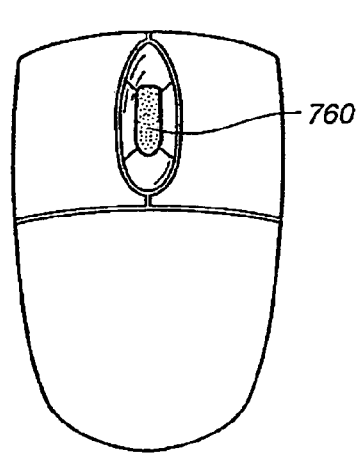 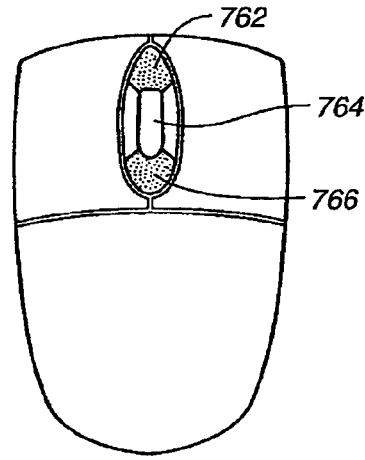
FIG._14A  FIG._14B
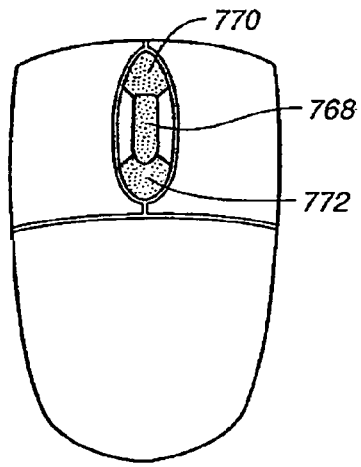 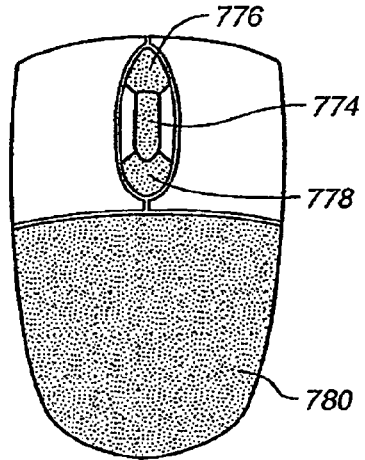
FIG._14C  FIG._14D

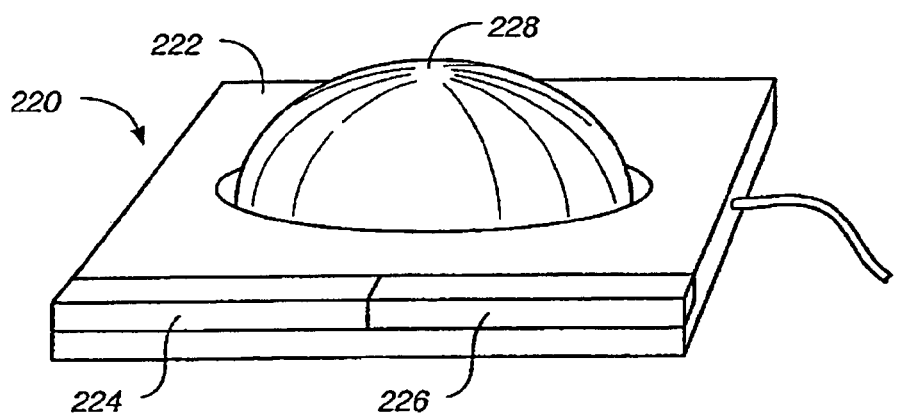
FIG._15
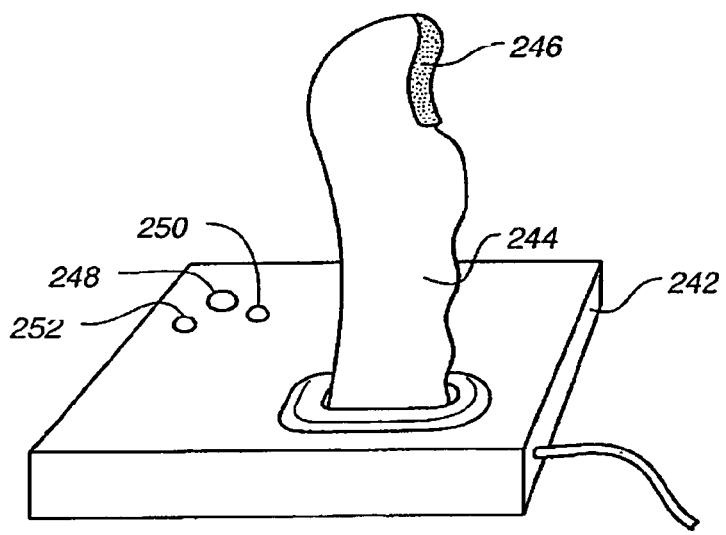
FIG._16
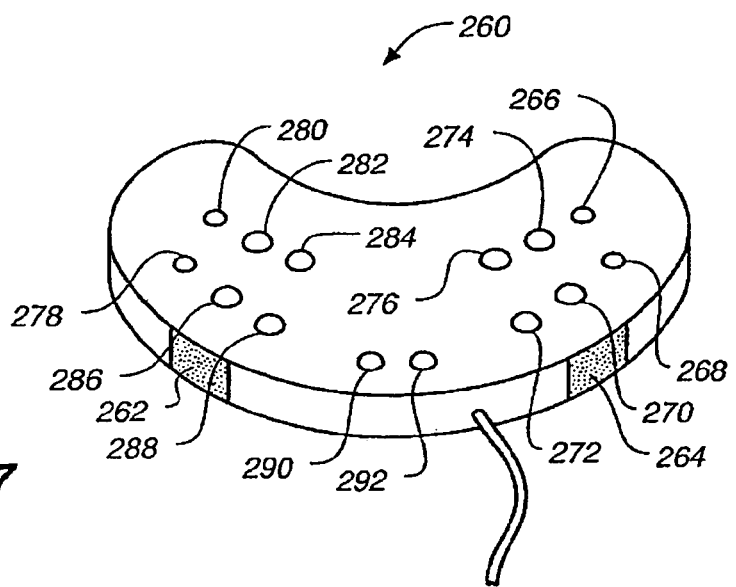
FIG._17

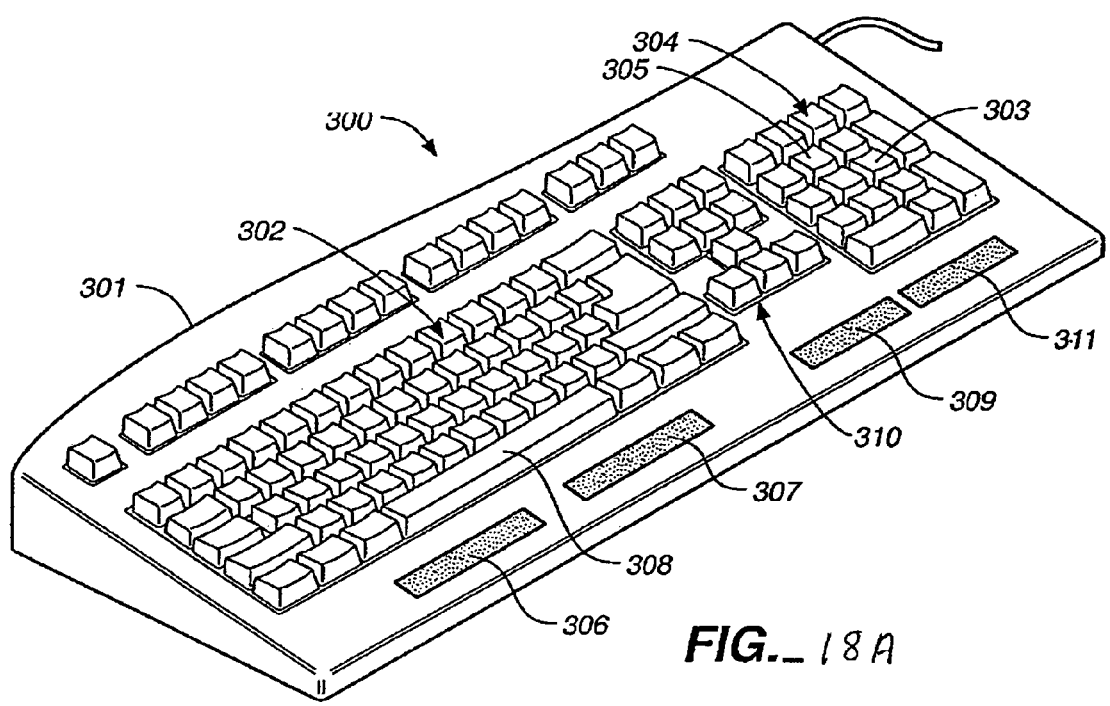
FIG._18A
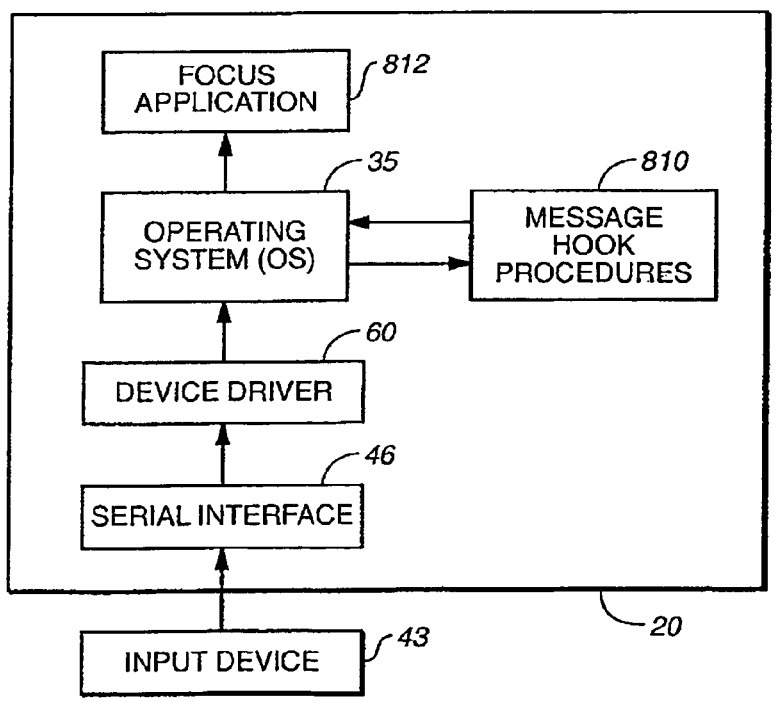
FIG._20

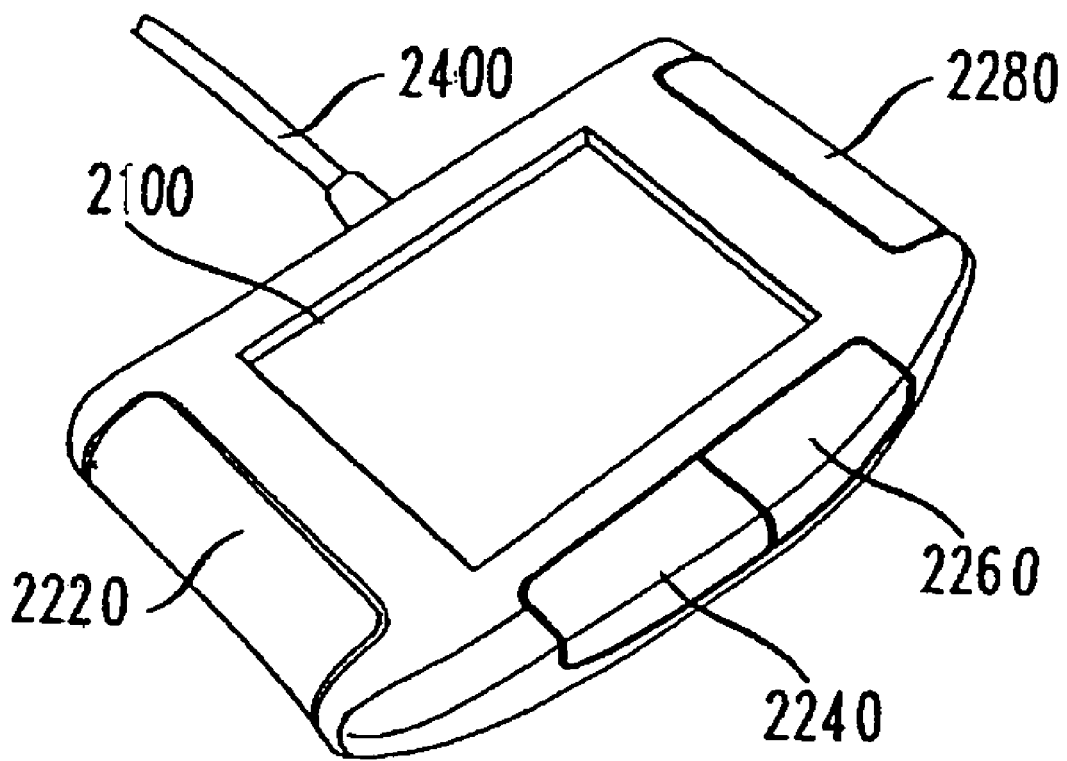
FIG. 19    2000
TOUCHPAD

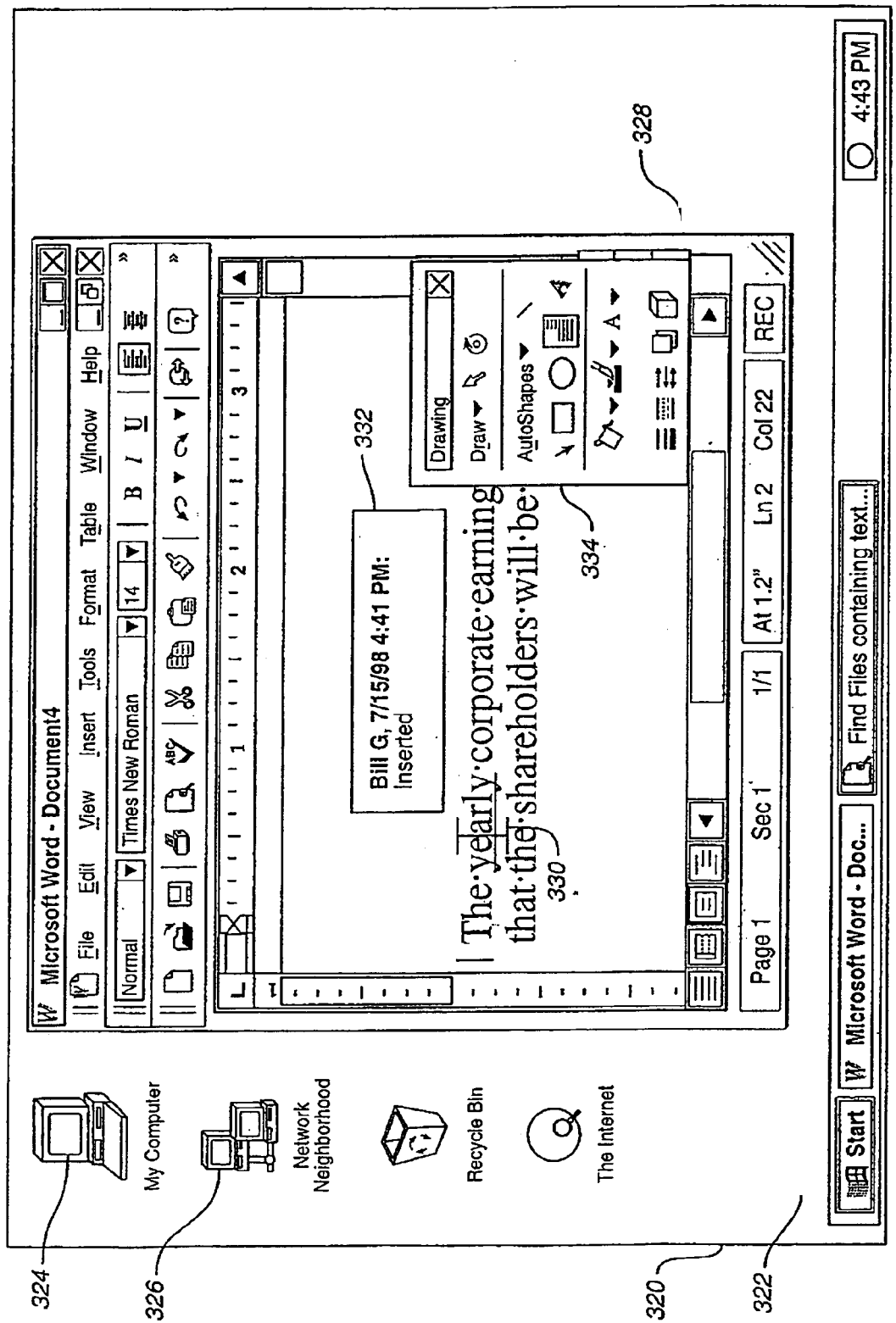
FIG._21

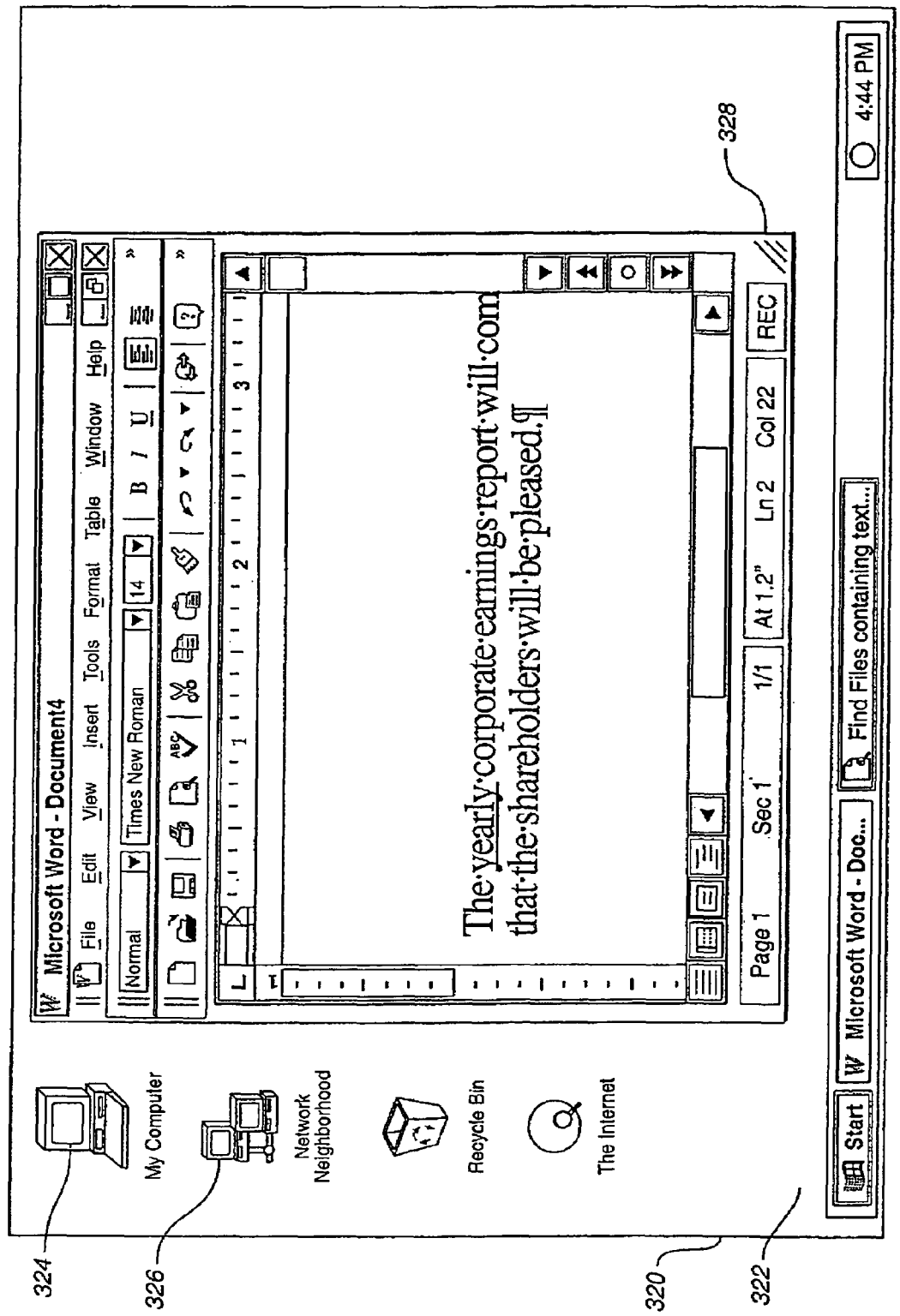
FIG._22

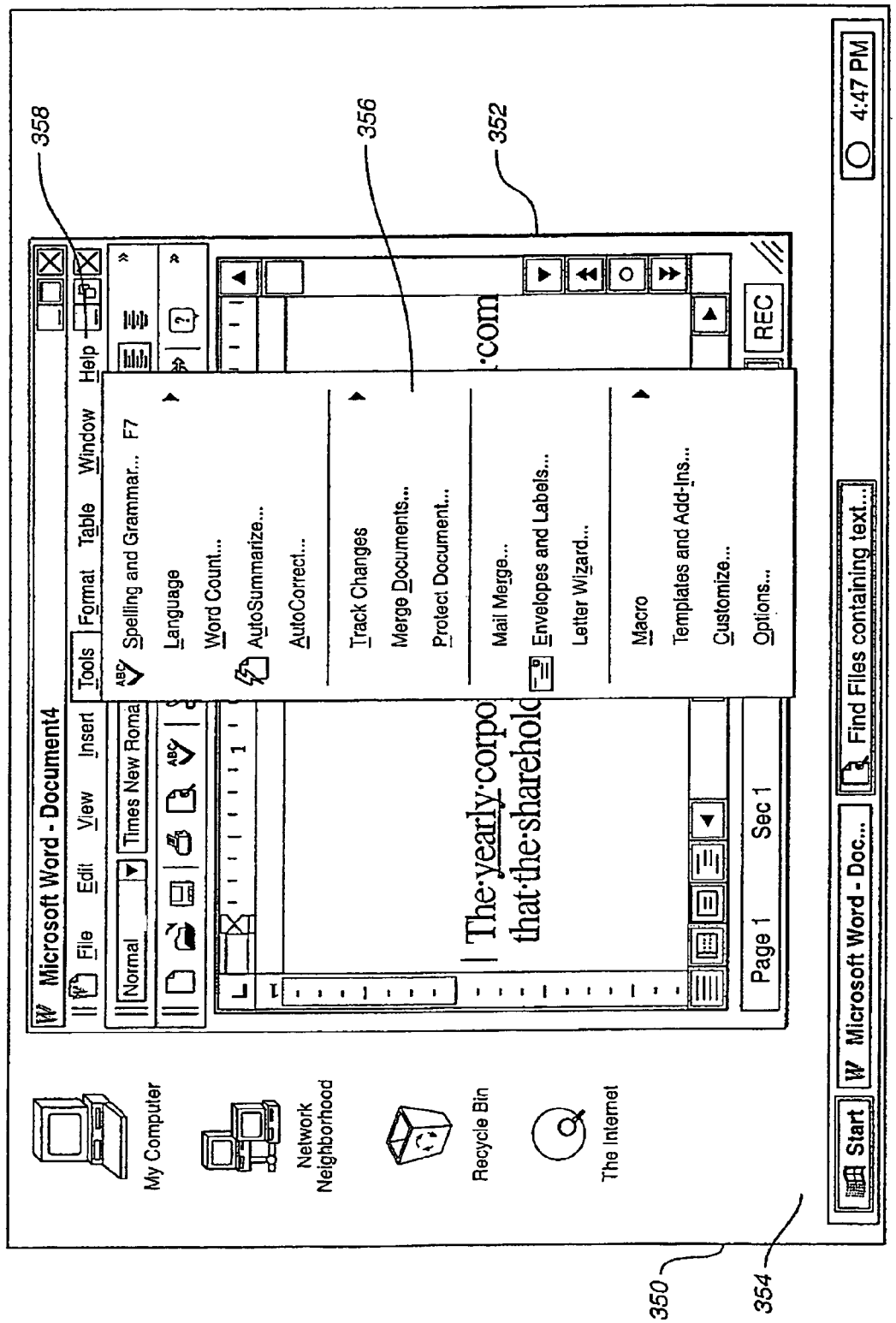
FIG._23

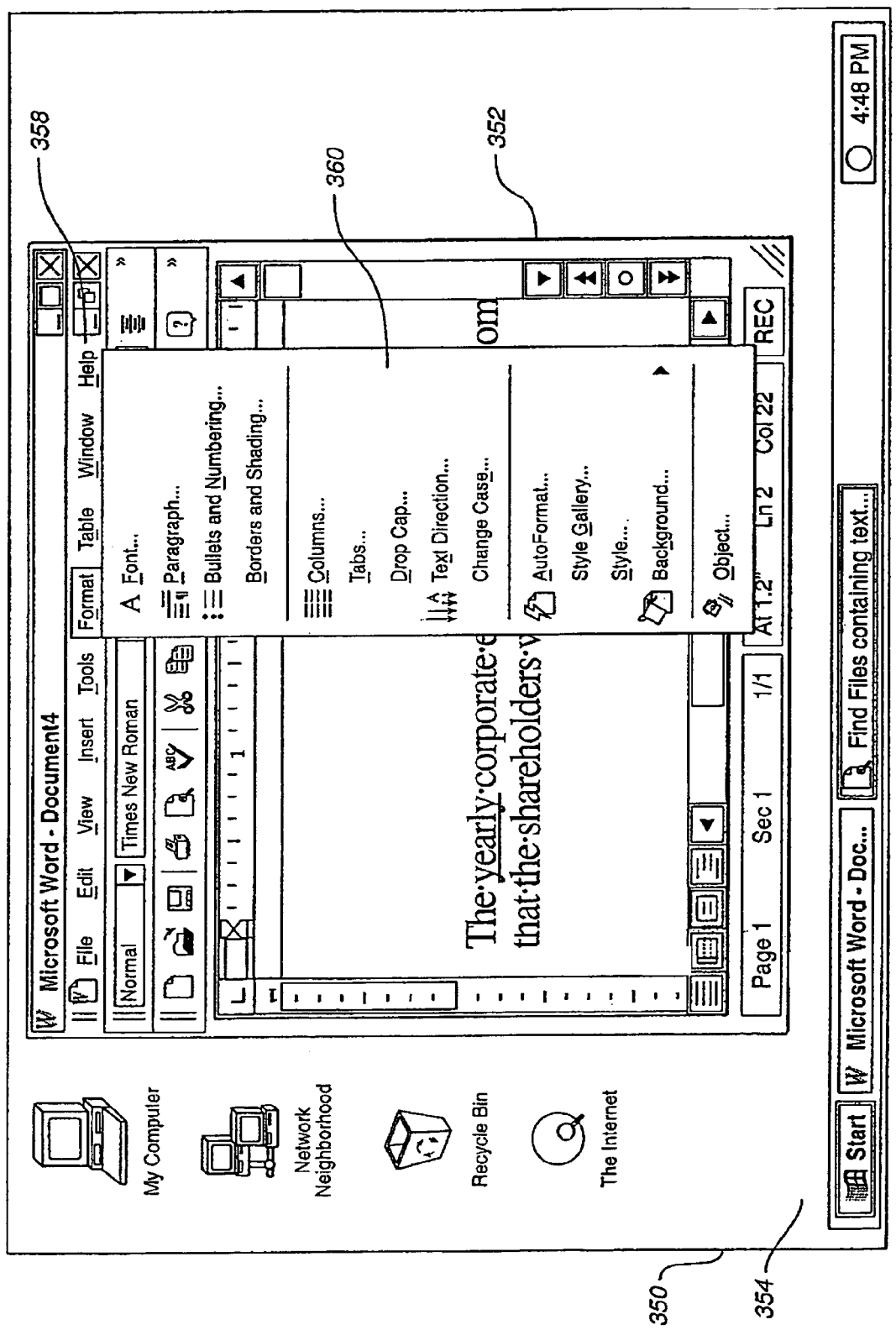
FIG._24

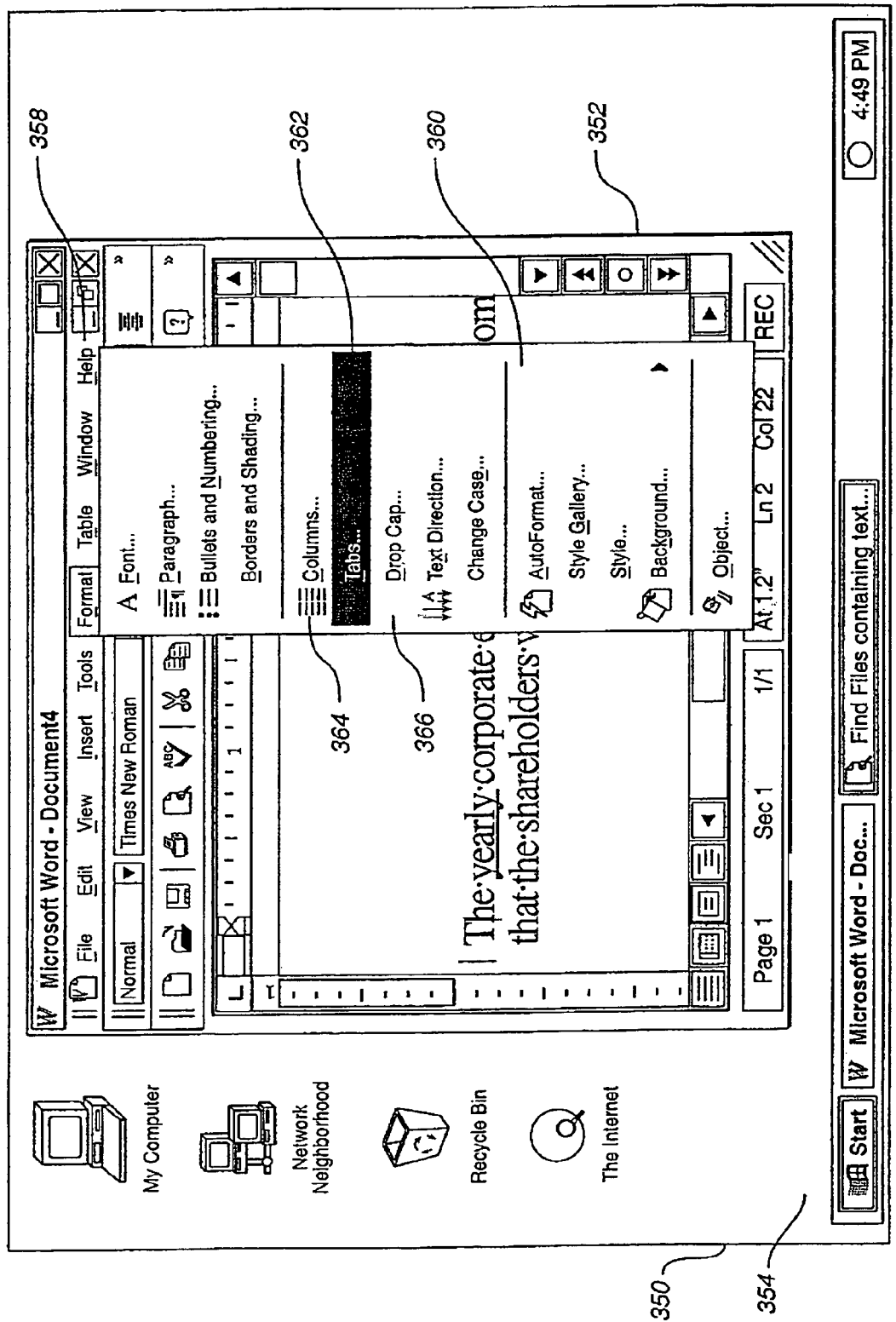
FIG._25

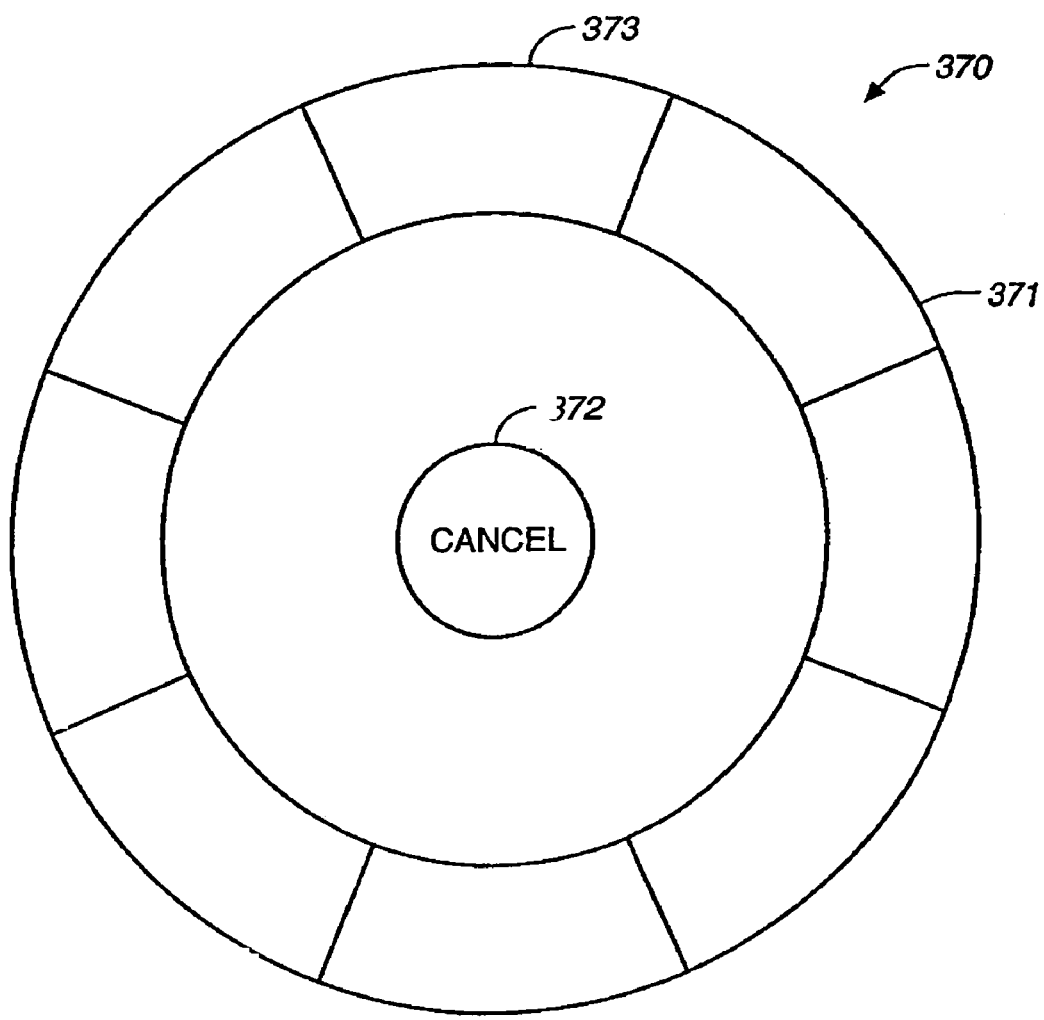
FIG._26

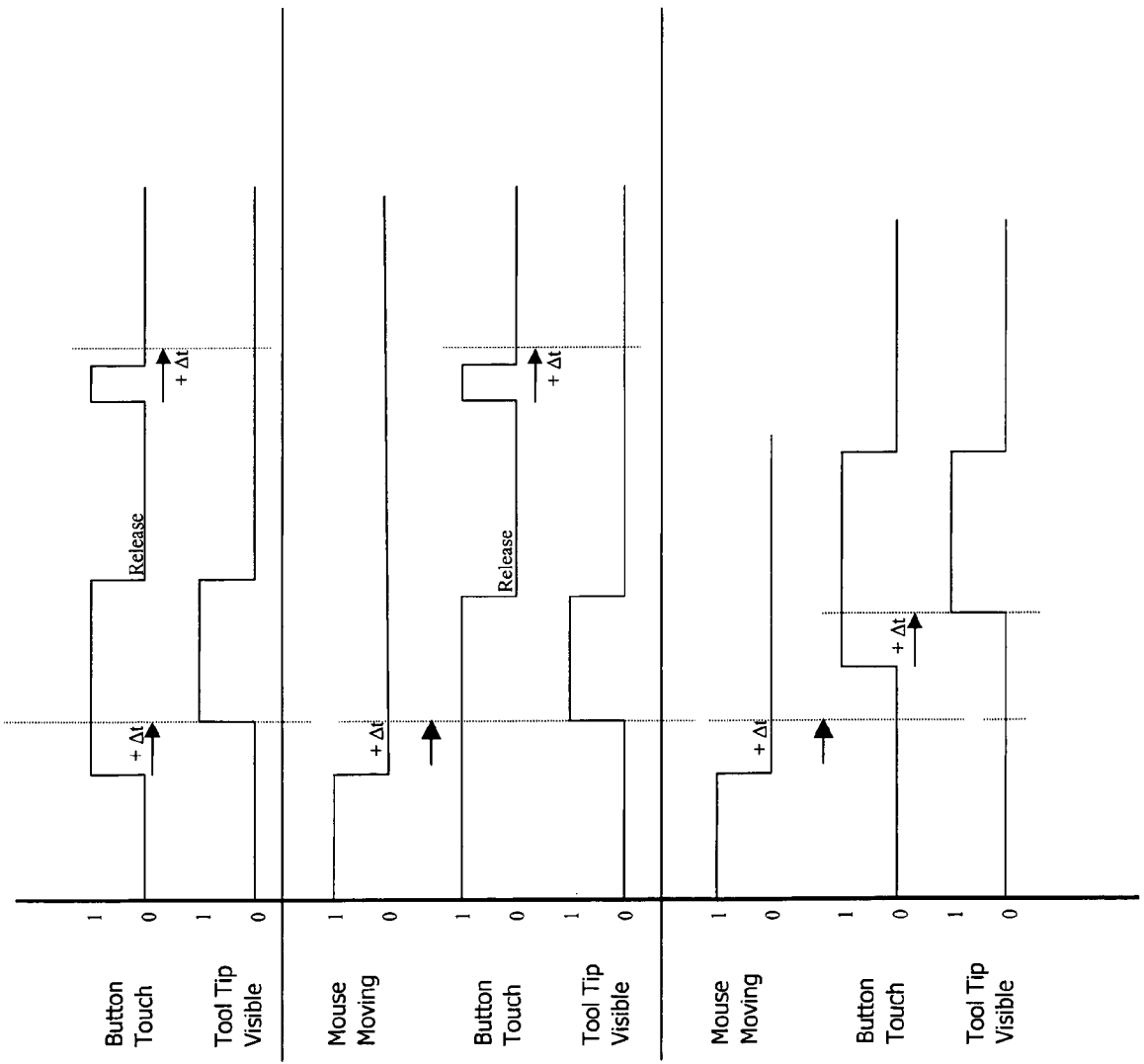

METHOD FOR DISPLAYING INFORMATION RESPONSIVE TO SENSING A PHYSICAL PRESENCE PROXIMATE TO A COMPUTER INPUT DEVICE

CROSS-REFERENCE TO RELATED APPLICATIONS

The instant application is a continuation-in part of commonly assigned, U.S. patent application entitled "Proximity Sensor in a Computer Input Device" to Hinckley et al., filed Sep. 14, 1998 now U.S. Pat. No. 6,456,275, and assigned Ser. No. 09/152,434, which is herein incorporated by reference. Also, the instant application is a continuation-in part of commonly assigned, U.S. patent application entitled "A Technique For Implementing a Two-Handed Desktop Use Interface For a Computer" to Hinckley, filed Sep. 14, 1998 now abandoned, and assigned Ser. No. 09/152,432, which is herein incorporated by reference. Further, the instant application is a continuation-in part of commonly assigned, U.S. patent application entitled "Method of Interfacing With a Computer Using a Proximity Sensor in a Computer Input Device" to Hinckley et al., filed Sep. 14, 1998 now U.S. Pat. No. 6,396,477, and assigned Ser. No. 09/152,443, which is herein incorporated by reference.

In addition, the instant application is a continuation-in part of commonly assigned, U.S. patent application entitled "A Technique For Implementing an On-Demand Display Widget Through Controlled Fading Initiated By User Contact With a Touch Sensitive Input Device" to Hinckley, filed Nov. 25, 1998 now U.S. Pat. No. 6,333,753, and assigned Ser. No. 09/200,325, which is herein incorporated by reference and which claims priority to United States provisional patent application entitled "Toolglass Improvements—On-Demand Tool Sheet; Gesturing Through Tool Sheets", filed Sep. 14, 1998 and assigned Ser. No. 60/100,261. The instant application is also a continuation-in part of commonly assigned, U.S. patent application entitled "A Technique For Implementing an On-Demand Tool Glass For Use in a Desktop User Interface" to Hinckley, filed Nov. 25, 1998 now U.S. Pat. No. 6,232,957 and assigned Ser. No. 09/200,321, which is herein incorporated by reference and which claims priority to United States provisional patent application entitled "Toolglass Improvements—On-Demand Tool Sheet; Gesturing Through Tool Sheets", filed Sep. 14, 1998 and assigned Ser. No. 60/100,261.

The present application is related to commonly assigned, copending U.S. patent application entitled "Method of Interacting With a Computer Using a Proximity Sensor in a Computer Input Device" to Hinckley et al., filed Apr. 5, 2000, and assigned Ser. No. 09/543,723, which is herein incorporated by reference and which is a continuation of U.S. patent application Ser. No. 09/152,443 identified above.

BACKGROUND OF THE INVENTION

A. Technical Field

The present invention relates to input devices for computer systems. More particularly, the present invention relates to the use of touch sensitive input devices in computer systems.

B. Related Art

Input devices for computerized systems such as keyboards, touchpads, trackballs, game controllers and mice, often include one or more auxiliary controls such as joysticks, touchpads, trackballs, headsets, microphones, buttons, knobs, rocker switches, triggers, sliders, wheels, biometric sensors, etc. Auxiliary controls may be used alone or in conjunction with input devices and other auxiliary controls.

Most input devices create input signals using transducers, or switches. Switches are typically found in the buttons of mice, joysticks, and game controllers, as well as in the keys of keyboards. Transducers are found in mice and trackballs and create electrical signals based on the movement of balls in those devices or by optically detecting movement of the device across a surface. Transducers are also found in headsets where they convert speech signals into electrical signals. Touchpads create input signals using sensors that provide an electrical signal when the user contacts the touchpad that signal including the location within the touchpad where contact is made.

Although it is desirable to increase the amount of information that an input device and its auxiliary controls can provide to the computer, the number of transducers and switches that can be added to an input device is limited by the user's ability to remember all of the functions that a particular transducer or switch performs and by the practicalities of the available or at least feasibly available real estate for the switches and transducers on the input device (e.g., keyboard or mouse). The ability of a user to determine the functionality of each auxiliary control is also generally limited to a static label on or near the auxiliary control, activating each auxiliary control, clicking a button to select a menu option to request help file or reading a user manual. Furthermore, the functionality of an auxiliary control may vary from one game or application to another game or application. Thus, a static label on an auxiliary control is of little value when the function and status of the input device and its auxiliary controls change from application to application. In this regard, even if a user learns the assignment of the buttons and other controls in one game or application, another game or application may assign the same buttons or controls different features. Similarly, the status of the feature controlled by the auxiliary control generally can only be determined by activating the control.

Thus, there is a need to provide a user with the ability to better determine the functionality and status of auxiliary controls regardless of their context, (e.g., active application or game).

To address this need, indicators such as LEDs or small LCDs may be integrated directly with the input device and its auxiliary controls to provide feedback or state information. However, association of LEDs or LCDs with each auxiliary control increases both the amount of power consumed and the cost of the input device. Furthermore, LEDs and LCDs have very limited output forms and are separated from the main display (e.g., a computer monitor) causing the user to constantly have to look away from the screen and at the auxiliary control to determine the functionality or status of the control. Such constant shifts of attention can mentally tire the user as he or she is forced to repetitively reacquire the current context. Accordingly, there is a need to provide a more efficient, convenient and/or cost effective way to determine the functionality and/or status of auxiliary controls of input devices in a computer system.

SUMMARY OF THE INVENTION

The present invention overcomes many of the shortcomings of existing input devices by providing touch sensitive input devices which have touch sensitive auxiliary controls that sense a physical presence and provide visual feedback on an on-screen display or on the control itself, acoustic feedback (e.g., voice or music) or tactile feedback (e.g., vibration).

In an aspect of the present invention, keys, buttons, knobs, rocker switches or other auxiliary controls of an input device such as a keyboard, touchpad, trackball, game controller, monitor, joystick, steering wheel, headset or mouse can be augmented with sensors that detect contact or extreme proximity of a user's hand. According to another aspect, a sensed signal of the auxiliary control can provide the user with an on-screen display of status, state information, tool tips, help text or other feedback relevant to the control the user has touched without the user having activated (e.g., depress, turn, roll or otherwise activate) the control. Alternatively, acoustic or tactile feedback may be provided to the user instead of or in addition to the feedback provided by the on-screen display. Hence, a user can simply touch different buttons or other controls to explore their function assignment or status, or obtain other feedback. Such feedback can allow the user to better understand the consequences of their action, should he or she subsequently chooses to activate the control. Also, a user may quickly and casually be able to view status information.

Aspects of the invention include providing context sensitive feedback for an auxiliary control in an on-screen display, such as a display widget (e.g., graphical user interface (GUI)), responsive to detection of a user's hand. Hence, touch sensitive controls can be used to predict the context of a user's action. The context of the situation can be established by preparatory actions by the user such as grabbing, touching or approaching a control. Knowing the context of the action, the computer can begin to execute and predict the will of the user.

According to another aspect of the invention, contexts of an auxiliary control may include, but are not limited to, different types of applications such as games, utility, and productivity applications. Also, contexts may change within various portions of an application or game.

In another aspect of the invention, when a GUI is displayed responsive to detection of a physical presence proximate to or contacting an auxiliary control, a user may interact with the GUI using another auxiliary control or an input device including, but not limited to, a mouse, touchpad or keypad. For example, if a volume control GUI is displayed, a user may adjust the volume with a mouse.

In another aspect of the invention, input devices including their auxiliary controls may have a touch sensor which directly detects when a physical presence (e.g., user) touches the device or its controls, so as to provide display and dismissal of feedback on an "on-demand" basis, e.g., whenever the user establishes or breaks physical hand contact with the device.

For example, a transition in a touch indication provided by the device reflective of the user then making contact with the device or control, such as by touching the device with a finger may cause a tool tip to be displayed. A transition indicative of a user breaking physical contact with the device, such as by lifting his finger off the device, can cause the tool tip to be dismissed from the display. In one aspect of the invention, to prevent user distraction, these detected transitions initiate corresponding predefined animation sequences that occur over preset time intervals in which the feedback either begins to fade into view (typically from an invisible, i.e., totally transparent state, to eventually a pre-defined semi-transparent state or non-transparent state) as soon as user contact begins, and then begins to fade out from view (i.e., eventually back to its invisible state) as soon as user contact with the device is broken, e.g., as soon as the user lifts his or her hand away from the device.

In another aspect of the invention, toolbars, scrollbars and the like may only be displayed on a display screen in response to detection of a physical presence. Illustratively, touching, and not activating, an auxiliary control may cause on-screen display of a toolbar and breaking contact with the control may cause dismissing of the toolbar. In one aspect of the invention, a user may interface with the toolbar using an auxiliary control or input device as desired with one hand while continuing to touch the auxiliary control which caused the on-screen display of the toolbar. According to this aspect, display clutter can be reduced and available application screen area increased at appropriate times during program execution consistent with and governed by user action but without imposing any significant cognitive burden on the user to do so. This, in turn, is likely to significantly improve the "user experience".

These and other novel advantages, details, embodiments, features and objects of the present invention will be apparent to those skilled in the art from following the detailed description of the invention, the attached claims and accompanying drawings, listed herein, which are useful in explaining the invention.

BRIEF DESCRIPTION OF THE DRAWINGS

FIG. 1 is a block diagram of a computer system according to an illustrative embodiment of the present invention.

FIG. 2 is a more detailed block diagram of an exemplary embodiment of an input device according to the present invention.

FIG. 3 is a perspective view of a headset according to an illustrative embodiment of the present invention.

FIG. 4A is a perspective view of a mouse according to an illustrative embodiment of the present invention.

FIG. 4B is a bottom view of the mouse of FIG. 4A.

FIG. 4C is a perspective view of an exemplary circuit board of the mouse of FIG. 4A.

FIG. 5 is a top view of another illustrative embodiment of a mouse according to the present invention.

FIG. 6A is a left side view of another illustrative embodiment of a mouse according to the present invention.

FIG. 6B is a left side view of another illustrative embodiment of a mouse according to the present invention.

FIG. 6C is a right side view of another illustrative embodiment of a mouse according to the present invention.

FIG. 6D is a right side view of another illustrative embodiment of a mouse according to the present invention.

FIGS. 7A and 7B are a left side view and a top view, respectively, of another illustrative embodiment of a mouse according to the present invention.

FIGS. 8A and 8B are a left side view and a top view, respectively, of another illustrative embodiment of a mouse according to the present invention.

FIGS. 9A-9C are a left side view, a top view, and a right side view, respectively, of another illustrative embodiment of a mouse according to the present invention.

FIGS. 10A-10H, are top views of different exemplary embodiments for a mouse button according to the present invention.

FIG. 11A is a top view of another illustrative embodiment of a mouse according to the present invention.

FIG. 11B is a top view of another illustrative embodiment of a mouse according to the present invention.

FIGS. 12A and 12B are right side views of different exemplary embodiments of mice according to the present invention.

FIGS. 13A-13D are left side views of different exemplary embodiments of mice according to the present invention.

FIGS. 14A-14D are top views of different exemplary embodiments of mice showing a touch sensor proximate to a wheel according to the present invention.

FIG. 15 is a perspective view of an illustrative trackball according to the present invention.

FIG. 16 is a perspective view of an exemplary game controller having a joystick according to the present invention.

FIG. 17 is a perspective view of an exemplary game controller according to the present invention.

FIG. 18A is a perspective view of an illustrative keyboard according to the present invention.

FIG. 19 is a perspective view of an illustrative touchpad according to the present invention.

FIG. 20 is a more detailed block diagram of the computer of FIG. 1.

FIG. 21 is an illustrative screen display that may appear before an input device of the present invention is touched.

FIG. 22 is an image of an illustrative screen display after an input device of the present invention has been touched.

FIG. 23 is an image of an illustrative screen display showing a pull-down menu activated according to the present invention.

FIG. 24 is an image of an illustrative screen display showing a second pull-down menu opened according to the present invention.

FIG. 25 is an image of an illustrative screen display showing an item selected in a pull-down menu according to the present invention.

FIG. 26 is an image of an illustrative screen display showing a radial menu according to the present invention.

FIGS. 35A-C show illustrative timing diagrams for controlling the display of a tool tip according to illustrative embodiments of the present invention.

DETAILED DESCRIPTION

Figure 18B:
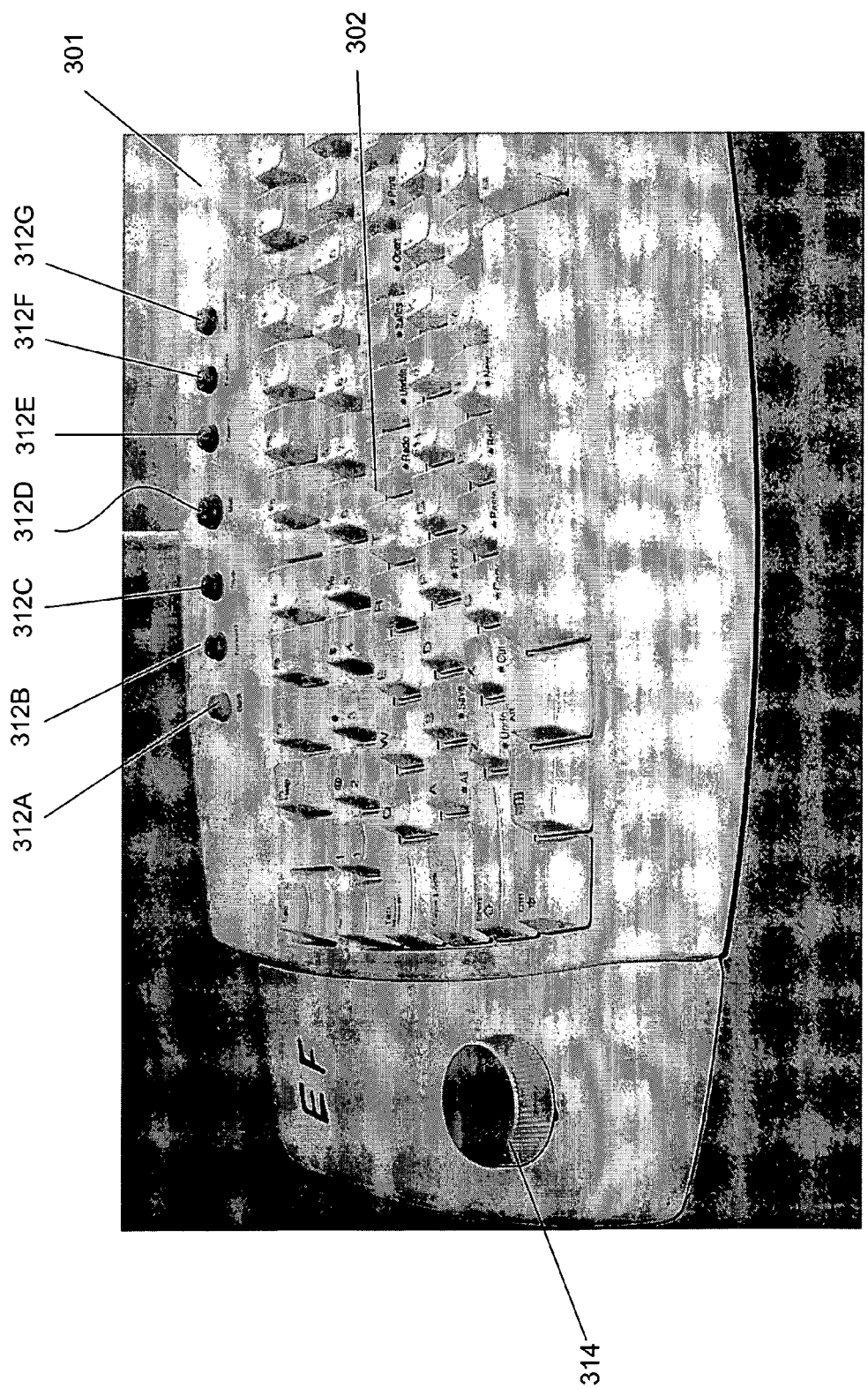
FIGS. 18B and 18C show portions of illustrative keyboards according to the present invention.

In accordance with illustrative embodiments of the present invention, an auxiliary control of an input device may be configured to detect when a physical presence (e.g., user's hand, stylus) touches the control so as to provide display and dismissal of a display widget on an "on demand" basis. The display widget may be a graphical user interface (GUI) and include information such as functionality (e.g., tool tips) and/or status information on an "on-demand" basis. An exemplary list of display widgets includes toolbars, tool glass sheet, scroll bars, window frames and window decorations, title bars, floating tool palettes, modal and non-modal dialog boxes, list or combo boxes, setting controls, buttons, text entry areas, etc.

A transition in a touch indication provided by the input device reflective of the user then making physical contact with an auxiliary control, such as by touching the control with a finger may cause a display widget to be displayed. A transition indicative of a user breaking contact with the auxiliary control, such as by lifting his finger off the control, causes the display widget to be dismissed. To prevent user distraction, these detected transitions can initiate corresponding predefined animation sequences that occur over preset time intervals in which the display widget either begins to fade into view (typically from an invisible, i.e., totally transparent, state to eventually a predefined semi-transparent state) as soon as user contact begins, and then begins to fade out from view (i.e., eventually back to its invisible state) as soon as user contact with the auxiliary control is broken, for example, as soon as the user lifts his or her finger from the control. Furthermore, depending on a specific touch-sensitive auxiliary control used, it is sometimes preferable to begin the fading after a brief time delay or "cooling period" occurs. For example, the user may reach the edge of the touchpad and "reclutch" his or her hand (e.g., briefly lift up his or her finger and then re-center it on the pad) to continue pointer motion. It might be annoying for the display widget to begin fading immediately when this happens. A brief time delay (e.g., approximately 0.5 to 1.0 seconds), coupled with continued contact sensing of the finger, prior to the start of the fading allows brief reclutchings of this sort without any changes to the screen display. Similarly, if a user has not touched the auxiliary control for a sufficiently long period of time, a similar time delay, coupled with sensing for a release of user contact, prior to the start of a fade-in might be used to prevent a short inadvertent contact from causing the display widget from fading in and then out, and otherwise annoying the user.

Furthermore, according to the present invention, touch induced display and dismissal can also readily be used to display and dismiss a display widget (e.g., toolbar) on an "on-demand" basis by sensing contact between a user's preferred hand and another touch sensitive auxiliary control or input device, such as, e.g., a touch sensitive mouse. Displaying a display widget in response to detection of touch, specifically when a user grabs an auxiliary control or input device, can exploit a user's desire, to utilize the display widget, implicit in the user's action in reaching for and grabbing the auxiliary control or input device. The display widget would be dismissed when the user releases the auxiliary control or input device, for example, when touch contact is broken. Displaying and dismissing a display widget in this fashion advantageously places little, if any, additional cognitive burden on the user.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes an illustrative computer system with a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, program data 38, and device drivers 60. The device drivers 60 processes commands and information entered by a user through input devices 43, which can include a keyboard, mouse, game controller, trackball, touchpad. The input devices also can have auxiliary controls such as a joystick, game pad, touchpad, trackball, key, headset, monitor, microphone, button, knob, rocker switch, trigger, slider, wheel, lever, touch strip, biometric sensor, etc. The input devices 43 may be wired or wirelessly coupled to the personal computer 20.

According to an exemplary embodiment of the present invention, at least one of the input devices includes a touch sensor 40 and an input device such as a mouse may have both a touch sensor 40 and a movement transducer 42. Touch sensor 40 is capable of generating a signal that indicates when a physical presence, such as a user's hand, is touching one of the input devices 43 itself or an auxiliary control thereof. Movement transducer 42 is capable of generating a signal that indicates when a user causes part of the input device to move. The signals generated by touch sensor 40 and movement transducer 42 can be passed along a conductor connected to the processing unit 21 through a serial port interface 46 that is coupled to the system bus 23, but may be connected by other interfaces, such as a sound card, a parallel port, a game port or a universal serial bus (USB).

A monitor 47 or other type of display device may also be connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

FIG. 2 is an expanded block diagram of a portion of one embodiment of an input device 43 of FIG. 1. Input device 43 includes an array of four touch sensors 100, 102, 104, and 106. The sensors may correspond to four auxiliary control of the input device. Each of the sensors produces an electrical signal along a respective conductor 108, 110, 112, and 114, which are connected to an analog-to-digital converter and multiplexer 116. Touch sensors 100, 102, 104, and 106, generate their electrical signals based on actual contact between the user and a portion of the sensor or based on extreme proximity between the user and the sensor. Those touch sensors that rely on contact are referred to as contact sensors and those that rely on proximity are referred to as proximity sensors. In the context of this application, a touch sensor is touched when it is contacted in the case of contact sensors or when the user is sufficiently proximate to the sensor in the case of proximity sensors. It should be understood that according to the present invention the sensor could be configured such that the required degree of contact for "touch" and "release" are different. For example, contact may be required to detect a "touch" event, while a breaking of contact and loss of proximity many be required to detect a "release" event. Similarly, in embodiments with a pure proximity sensor, very close proximity may be required to detect a "touch" event, but a larger threshold (distance) may be required to detect a "release" event.

In some contact sensor embodiments, a touch sensor includes a conductive film that has a capacitance that changes when it is touched. This sensor also includes a capacitive measuring circuit that generates an electrical signal based on the change in capacitance of the conductive film. Those skilled in the art will recognize that other contact sensor technologies are available such as photodiodes, piezoelectric materials, and capacitive pressure sensors. Any of these sensors may be used within the context of the present invention. In one proximity sensor embodiment, the touch sensor uses reflected light from an LED to detect when the user is proximate the sensor. A chip used to drive the LED and sense the reflected light according to this illustrative embodiment may be produced by Hamamatsu Corporation of Bridgewater, N.J. Other proximity sensor embodiments use changes in electric or magnetic fields near the input device to determine when the user is proximate to the device.

In embodiments of the present invention, the touch sensors may provide the same information regardless of where on the touch sensor the user touches the input device or the portion of the sensor to which the user is proximate. Thus, these touch sensors decouple touch data from position data. FIG. 2 provides an illustrative input device with this type of touch sensor.

In other embodiments, for example with touchpads, touch screens, and touch tablets, a given touch sensor may provide location information that would indicate where the user made contact within that touch sensor or where the user came closest to the touch sensor within the touch sensor. In these devices, one cannot specify positional data without touching the device, nor can one touch the device without specifying a position. Hence, touch sensing and position sensing are tightly coupled in these devices.

Referring to FIG. 2, analog-to-digital converter and multiplexer 116 converts the analog electrical signals found on conductors 108, 110, 112, and 114, into digital values carried on a line 118. Line 118 is connected to microcontroller 120, which controls multiplexer 116 to selectively monitor the state of the four touch sensors. Microcontroller 120 also receives inputs from various other sensors on the input device. For simplicity, these inputs are shown collectively as input 122. Those skilled in the art will recognize that different input devices and auxiliary controls provide different input signals depending on the types of motion sensors in the input device. Examples of motion sensors include switches, which provide signals indicative of the motion needed to close a switch; microphones, which provide signals indicative of air movement created by an audio signal; encoder wheels, which provide signals indicative of the motion of a mouse ball, trackball, or mouse wheel; and resistance wipers, which provide electrical signals indicative of the movements of a joystick. Each of these motion sensors acts as an input generator that is capable of generating input information to be sent to the computer system. Based on the particular input generator, this input information can include a depressible key's state, a depressible button's state, sound information, or movement information.

Those skilled in the art will also recognize that the number of input lines tied to microcontroller 120 depends on the number of sensors on the input device and the configuration of the input device. For example, for a keyboard, the microcontroller uses input lines to determine if any of the auxiliary controls have been activated. The micro controller accomplishes this using a multiplexer (not shown) to sequentially test the state of each auxiliary control on the keyboard. The techniques used to detect these auxiliary control states closures are well known in the keyboard art.

In a mouse or trackball, input lines 122 include lines for detecting the closure of switches and lines for detecting the rotation of encoder wheels. The switches are located beneath buttons on the mouse or trackball. The encoder wheels track the movement of the mouse ball or trackball. Typically, one encoder wheel tracks movement in the X direction and another encoder wheel tracks movement in the Y direction. In most embodiments, each encoder wheel has its own associated input line into microcontroller 120. In some mice, an additional encoder wheel tracks the rotation of a wheel located on top of the mouse.

In some mice, the X and Y movement of the mouse is tracked by a separate optics microcontroller that is connected to microcontroller 120 through lines 122. The optics microcontroller uses optical data to determine movement of the mouse. The optical microcontroller converts this optical data into movement values that are transmitted to microcontroller 120 along input lines 122.

In a game controller such as a game pad, input lines 122 include lines for detecting the closure of multiple switches on the game pad as well as lines for detecting the rotation of wheels on the game pad. In joysticks, input lines 122 can include lines connected to resistance wipers on the joystick as well as switches on the joystick. In headsets, lines 122 include multiple lines that carry multi-bit digital values indicative of the magnitude of the analog electrical signal generated by the microphone. An analog-to-digital converter typically produces these digital values. To reduce the weight of the headset, the analog-to-digital converter and microcontroller 120 can be found on a soundboard located within the computer. To further reduce the weight of the headset, multiplexer and A-to-D converter 116 of FIG. 2 can also be implemented on the soundboard.

Microcontroller 120 produces an output 124, which is provided to serial port interface 46 of FIG. 1. Typically, output 124 is a serial, digital value that indicates which motion sensor or touch sensor has been activated. For keyboards, the digital values include scan codes that uniquely identify the key, other auxiliary control or touch sensor on the keyboard that has been activated. For mice, the digital values include a mouse packet that describes the current state of each switch and each touch sensor on the mouse as well as the distances that the mouse wheel and mouse ball have moved since the last mouse packet was sent.

FIG. 3 is a perspective view of a headset 150 of the present invention. Headset 150 includes a microphone 152, a support piece 154, a touch sensor 156, and an output line 158. Support piece 154 is designed to loop around a user's ear to support the headset such that microphone 152 is positioned in front of the user's mouth.

Output line 158 carries signals from microphone 152 and from touch sensor 156. In some embodiments, headset 150 is connected to a computer system that includes a speech recognition system. In these embodiments, the speech recognition system is inactive unless touch sensor 156 indicates that a user is touching headset 150. The activation of the speech recognition system can include loading the speech recognition system into random access memory when the user first touches headset 150. It can also include prompting a speech recognition system that resides in random access memory so that it can process input speech signals. In either case, by only activating the speech recognition system when headset 150 indicates that the user is touching the headset, the present invention reduces the likelihood that extraneous speech will be processed by the speech recognition system.

FIG. 4A is a perspective view of one embodiment of a mouse 170 according to an illustrative embodiment of the present invention. Mouse 170 includes a palm-rest 172, a left button 174, a right button 176, a wheel 178, a side 180, and an output line 182. Palm-rest 172, left button 174, and two side areas 184 and 186 of side 180 are coated with separate conductive films. Each of the conductive films is connected to and forms part of a separate sensor such as sensors 100, 102, 104, and 106 of FIG. 2.

FIG. 4B shows a bottom view of mouse 170. Mouse 170 includes a trackball 190 located in a trackball nest 192. When mouse 170 is moved across a surface through force applied at palm-rest 172, side 180, left button 174, or right button 176, trackball 190 rolls within nest 192. Referring to FIG. 4C, a pair of encoder wheels 194 and 196 detects this rolling.

FIG. 4C is a perspective view of some of the internal electronics 189 of mouse 170. In FIG. 4C, trackball 190 has been omitted for clarity. Internal electronics 189 include encoder wheels 194 and 196, which detect movements of trackball 190 along two perpendicular directions. The encoder wheels produce electrical signals that are provided to microcontroller 200, which also receives inputs from switches 202 and 204 located under left button 174 and right button 176, respectively. Switches 202 and 204 indicate when left button 174 and right button 176, respectively, have been depressed by the user. Microcontroller 200 also receives signals from switch 201, which indicates when wheel 178 has been depressed, and an encoder wheel 203, which indicates rotational movement of wheel 178. Microcontroller 200 also receives electrical signals from the four sensors attached to the conductive films on the palm-rest 172, left button 174, and side areas 184 and 186 of FIG. 4A. These four sensors are grouped together in FIG. 4C as sensor array 206. The left button 174 and side areas 184 and 186 may be auxiliary controls which when pressed are activated to perform a function.

Thus, a mouse according to exemplary embodiments of the present invention is able to detect when certain areas of the mouse are being touched and when portions of the mouse or the entire mouse are being moved. Specifically, the conductive films on the palm-rest 172, left button 174, and side areas 184 and 186 indicate when the user is touching these areas. Note that even if the user does not move the mouse or press a button, the sensors associated with the conductive films of FIG. 4A will generate an electrical signal when the user touches the mouse. Encoder wheels 194 and 196 generate a separate electrical signal when the user moves the mouse and switches 202, 204, and 201 generate separate electrical signals when the user depresses buttons 174 and 176, and wheel 178 respectively. Thus, an exemplary mouse according to the present invention adds functionality without increasing dexterity needed to manipulate the controls thereof.

In alternative embodiments of the present invention, trackball 190 and encoder wheels 194 and 196 are replaced by a solid-state position-tracking device that collects images of the surface that the mouse travels over to determine changes in the position of the mouse. According to these exemplary embodiments, the mouse typically includes a light source used to illuminate the surface, an optics system used to collect images of the surface, and a processor used to compare the various images to determine if the mouse has moved, and if so, in what direction. Since the solid-state position-tracking device converts movement into an electrical signal, it can be considered to be a sophisticated transducer or motion sensor.

FIGS. 5, 6A-6D, 7A-7B, 8A-8B, 9A-9C, 10A-10H, 11A-11B, 12A-12B, 13A-13D, and 14A-14D show alternative configurations for a mouse according to illustrative embodiments of the present invention. FIG. 5 is a top view of a mouse that only has a touch sensor on its palm rest 600. FIGS. 6A and 6B, show separate illustrative mice embodiments with each having a sensor at the palm rest and along the left side of the mouse. In FIG. 6A, which is a side view, a single sensor 602 covers both the palm rest and the left side of the mouse. In FIG. 6B, also a side view, one sensor covers a palm rest 604 and a separate sensor covers a left side 606.

FIGS. 6C and 6D show separate illustrative mice embodiments of the present invention with each having a sensor at the palm rest and along the right side of the mouse. In FIG. 6C, which is a right side view, a single sensor 603 covers both the right side and the palm rest. In FIG. 6D, also a right side view, one sensor 605 covers the palm rest and a separate sensor 607 covers the right side.

FIGS. 7A and 7B show a side view and a top view, respectively, of an exemplary mouse embodiment having a single sensor 608 across a palm rest and a left side of the mouse, and a separate sensor 610 on the left button of the mouse. FIGS. 8A and 8B show a side view and a top view, respectively, of an exemplary mouse embodiment having a single touch sensor 612 across the palm rest and left side of the mouse, a touch sensor 614 on the left button of the mouse and a touch sensor 616 on the right button of the mouse.

FIGS. 9A-9C show a left side view, a top view and a right side view, respectively, of an illustrative mouse 690 of the present invention. Mouse 690 includes a left side sensor 692, a palm sensor 694, a right side sensor 696, and a button sensor 698. In mouse 690, right side sensor 696 and left side sensor 692 are separate from palm sensor 694. In another illustrative embodiment of the present invention, these three sensors can be formed as a single sensor.

FIGS. 10A-10H show top views of different exemplary mice embodiments showing possible configurations for touch sensors on the left button of a mouse. These button configurations may appear alone on the mouse or in combination with other sensors on other parts of the mouse. FIG. 10A shows a single solid sensor 618 across the entire left button. FIG. 10B shows a set of six sensor strips 620 with each sensor strip producing a separate electrical signal when touched. FIG. 10C shows two regions 624 and 626 separated by a ridge 628. Both region 624 and 626 end at a front end 627 of button 622. FIG. 10D shows two regions 634 and 637 separated by a ridge 636, where regions 634 and 637 both end at a side end 631 of button 630. The configurations of buttons 622 and 630 are particularly useful in paging through documents as discussed below. FIG. 10E shows a button configuration for a button 640 having four separate sensor areas formed as squares 641, 642, 643, and 644. In some embodiments, the lines that separate the four sensor areas are formed as ridges that have a different topography from the sensor areas. FIG. 10F also shows four separate sensors on a button 646. In FIG. 10F, three of the sensor areas 650, 651 and 652 are found at a front end of button 646, and the remaining sensor 648 covers the remainder of button 646. FIG. 10G shows a button 660 with nine sensor regions arranged in a layout similar to a keypad. FIG. 10H shows a button 670 with an outer circle of eight sensors 672 that surrounds a central sensor 674. The configuration of button 670 is especially useful for manipulating radial menus.

FIGS. 11A and 11B show illustrative mice embodiments that include separate sensors on both buttons of the mouse. In FIG. 11A, buttons 700 and 702 have sensors but palm rest 704 does not have a sensor. In FIG. 11B, buttons 706 and 708 and palm rest 710 have separate sensors.

FIGS. 12A and 12B show exemplary mice embodiments with multiple sensors along the right side of the mouse. In FIG. 12A, which is a right side view, there are two sensors 720 and 722 along the right side. In FIG. 12B, there are three sensors 724, 726, and 728 along the right side.

FIGS. 13A-13D show side views of exemplary mice embodiments with multiple sensors along the left side of the mouse. The mouse of FIG. 13A has two sensors 734 and 736 along the left side. In FIG. 13B, the mouse has three touch sensors 738, 740, and 742, each separated by a space. The mouse of FIG. 13C also has three touch sensors along the left side. However, in FIG. 13C, middle touch sensor 744, which is located between sensors 746 and 748, has a raised surface and is formed as a ridge between sensors 746 and 748. The raised surface of sensor 744 provides tactile feedback to the user to allow the user to determine the position of their thumb without looking at the mouse. FIG. 13D shows a mouse embodiment with a plurality of strips 752 running along the left side of the mouse.

Note that all of the exemplary embodiments of FIGS. 12A-12B and FIGS. 13A-13D can be practiced with a sensor located on the palm rest and/or a sensor located on the left button and/or a sensor located on the right button.

FIGS. 14A-14D are top views of illustrative mice embodiments with touch sensors proximate a wheel on a mouse. In FIG. 14A, the touch sensor is located directly on a wheel 760. In FIG. 14B, one touch sensor 762 is located forward of a wheel 764, and one touch sensor 766 is located in back of wheel 764. In the embodiment of FIG. 14B, wheel 764 does not have a touch sensor. In FIG. 14C, one touch sensor 770 is located in front of a wheel 768 and one touch sensor 772 is located in back of wheel 768. In addition, wheel 768 includes a touch sensor. In the embodiment of FIG. 14D, touch sensors are located on a wheel 774, front area 776, which is in front of wheel 774, back area 778, which is in back of wheel 774, and palm rest 780.

Although various exemplary embodiments have been described with particularity with respect to touch sensor location in FIGS. 5, 6A-6D, 7A-7B, 8A-8B, 9A-9C, 10A-10H, 11A-11B, 12A-12B, 13A-13D, and 14A-14D, it should be noted that sensors may be included in other locations. For example, it is possible to combine some or all of the touch sensors illustrated in one embodiment with some or all of the touch sensors illustrated in one embodiment with some or all of the touch sensors illustrated in another embodiment. Further, it should be understood that many of the touch sensor locations including, but not restricted to, those on the sides of the mice in FIGS. 5, 6A-6D, 7A-7B, 8A-8B, 9A-9C, 10A-10H, 11A-11B, 12A-12B, 13A-13D, and 14A-14D may be conductive films on top of auxiliary controls, where the controls can be activated to perform a function when pressed. In this instance, one set of electrical signals is generated when the control is touched and a second set of electrical signals is generated when the control is activated. In certain illustrative embodiments of the invention, various mice including their auxiliary controls (e.g., buttons, wheels) can detect a physical presence (e.g., a finger) contacting a touch sensitive surface thereof, the physical presence representing an explicit user request to display a display widget on a display screen and/or to generate other feedback (e.g., acoustic, tactile). The feedback can provide information to the user such as status information, control functionality, and help text. The information may vary from application to application. In some embodiments of the invention, the position of the display widget on the display screen may track the movement of the physical presence across the touch sensitive surface.

FIG. 15 is a perspective view of an illustrative trackball 220 of the present invention. Trackball 220 includes a base 222, buttons 224 and 226, and a ball 228. In one embodiment of the present invention, trackball 228 can be coated with a conductive film that is contacted by three rotating metal wheels (not shown) in base 222. One of the metal wheels is contacted by a conductive sheet that sits behind the wheel and is pressed into the wheel by a spring force. The conductive sheet is further connected to a touch sensor that produces an electrical signal when a user touches trackball 228. The other two wheels in base 222 form two orthogonal motion sensors (not shown) capable of tracking the rotary motion of trackball 228 in base 222. Beneath buttons 224 and 226, base 222 includes two switches that are capable of generating electrical signals when a user depresses buttons 224 and 226. Thus, trackball 220 is able to provide one electrical signal based on the user simply touching ball 228 and separate electrical signals based on the user moving trackball 228 or depressing buttons 224 or 226. Also, one or more auxiliary controls, which can be activated to perform functions, may be located on the base 222 around the periphery of the trackball 228. The auxiliary controls may have a touch sensitive conductive film thereon and may be activated to perform functions in response to a user pressing the control thereby generating one set of electrical signals when the control is touched and a second set of electrical signals when the control is activated. In exemplary embodiments of the invention, the trackball and its auxiliary controls (e.g., buttons) can detect a physical presence (e.g., a finger) contacting a touch sensitive surface thereof, the physical presence representing an explicit user request to display a display widget on a display screen and/or to generate other feedback (e.g., acoustic, tactile). The feedback can provide information to the user such as status information, control functionality, and help text. The information may vary from application to application. In some embodiments of the invention, the position of the display widget on the display screen may track the movement of the physical presence across the touch sensitive surface.

FIG. 16 is a perspective view of an illustrative game controller having a joystick that includes a base 242, a handle 244, and a trigger 246, and buttons 248, 250, and 252. In one embodiment of the present invention, trigger 246 can be coated with a conductive film that is connected to a touch sensor within base 242. In further embodiments, button 248 may also be coated with a conductive film connected to a separate touch sensor in base 242. Trigger 246 and buttons 248, 250, and 252 may be further connected to switches that provide respective electrical signals when the user depresses the respective buttons or trigger. Handle 244 can be connected to a set of transducers that track the relative motion of handle 244 relative to base 242. Thus, the game controller can provide a set of electrical signals when the user is touching trigger 246 or button 248 and a separate set of electrical signals when the user moves handle 244 or moves trigger 246 or buttons 248, 250, or 252.

FIG. 17 is a perspective view of another illustrative game controller according to the present invention. In FIG. 17, a game controller in the form of a game pad 260 is depicted. The game pad 260 has side buttons 262 and 264, left hand buttons 266, 268, 270, 272, 274, and 276 and right hand buttons 278, 280, 282, 284, 286, and 288. In addition, game pad 260 has a start button 290 and a select button 292. In some embodiments of the present invention, side buttons 262 and 264 may each be coated with a conductive film that is connected to a respective touch sensor within game pad 260. Game pad 260 can also include a plurality of switches, one switch for each button on the game pad. Thus, in some embodiments, game pad 260 is able to provide one set of signals indicative of when the user is touching side buttons 262 and 264 and a second set of electrical signals indicative of when the user has depressed a button on game pad 260.

In illustrative embodiments of the invention, game controllers such as those of FIGS. 16 and 17 including their auxiliary controls (e.g., buttons, joystick, trigger) can detect a physical presence (e.g., a finger) contacting a touch sensitive surface thereof, the physical presence representing an explicit user request to display a display widget on a display screen and/or to generate other feedback (e.g., acoustic, tactile). The feedback can provide information to the user such as status information, control functionality, and help text. The information may vary from application to application. In some embodiments of the invention, the position of the display widget on the display screen may track the movement of the physical presence across the touch sensitive surface.

FIG. 18A depicts a keyboard 300 according to an exemplary embodiment of the present invention. The keyboard 300 has a typical QWERTY layout 302 on the left side of the keyboard and a numeric keypad 304 on the right side. Numeric keypad 304 includes the numbers 0-9 with the numbers 1-9 appearing in a 3×3 box. In some embodiments, all nine of these keys can be covered with a conductive film. In other embodiments, other keys and auxiliary controls on the keyboard may be covered by the conductive film. The conductive film on each key is connected to and forms part of a separate touch sensor in keyboard 300. The fact that each key has a conductive film means that the keys can each provide two signals. One signal may be provided when the user touches, but does not depress the key, and a second signal may be provided when the user depresses the key.

Additional touch sensors can be located on keyboard casing 301 at portions 306 and 307 below space bar 308, at portion 309 below arrow keys 310, and at a portion 311 below keypad 304. Arrow keys 310 are typically used by the user to move a cursor across the display. Note that although keyboard 300 is shown with touch sensors on the keys and touch sensors on portions 306, 307, 309, and 311, other exemplary embodiments of the invention may only have touch sensors on the keys or only on one of the portions 306, 307, 309, and 311. In other exemplary embodiments, different combinations of these touch sensors can be found on the keyboard 300. In addition, some or all of the touch sensors on portions 306, 307, 309, and 311 may be proximity sensors. Touch sensors 306, 307, 309 and 311 may represent many types of auxiliary controls including, but not limited to, a joystick, game pad, touchpad, trackball, button, knob, rocker switch, trigger, slider, wheel, lever, etc. The proximity sensors can detect the user's hand when it is near the sensor without requiring the hand to actually contact the sensor. Generally, one signal is provided when the user touches, but does not activate (e.g., depress, turn, roll), the auxiliary control, and a second signal is provided when the user activates the auxiliary control. In exemplary embodiments of the invention, a keyboard including its auxiliary controls can detect a physical presence (e.g., a finger) contacting a touch sensitive surface thereof, the physical presence representing an explicit user request to display a display widget on a display screen and/or to generate other feedback (e.g., acoustic, tactile). The feedback can provide information to the user such as status information, control functionality, and help text. The information may vary from application to application. In some embodiments of the invention, the position of the display widget on the display screen may track the movement of the physical presence across the touch sensitive surface.

Figure 18C:
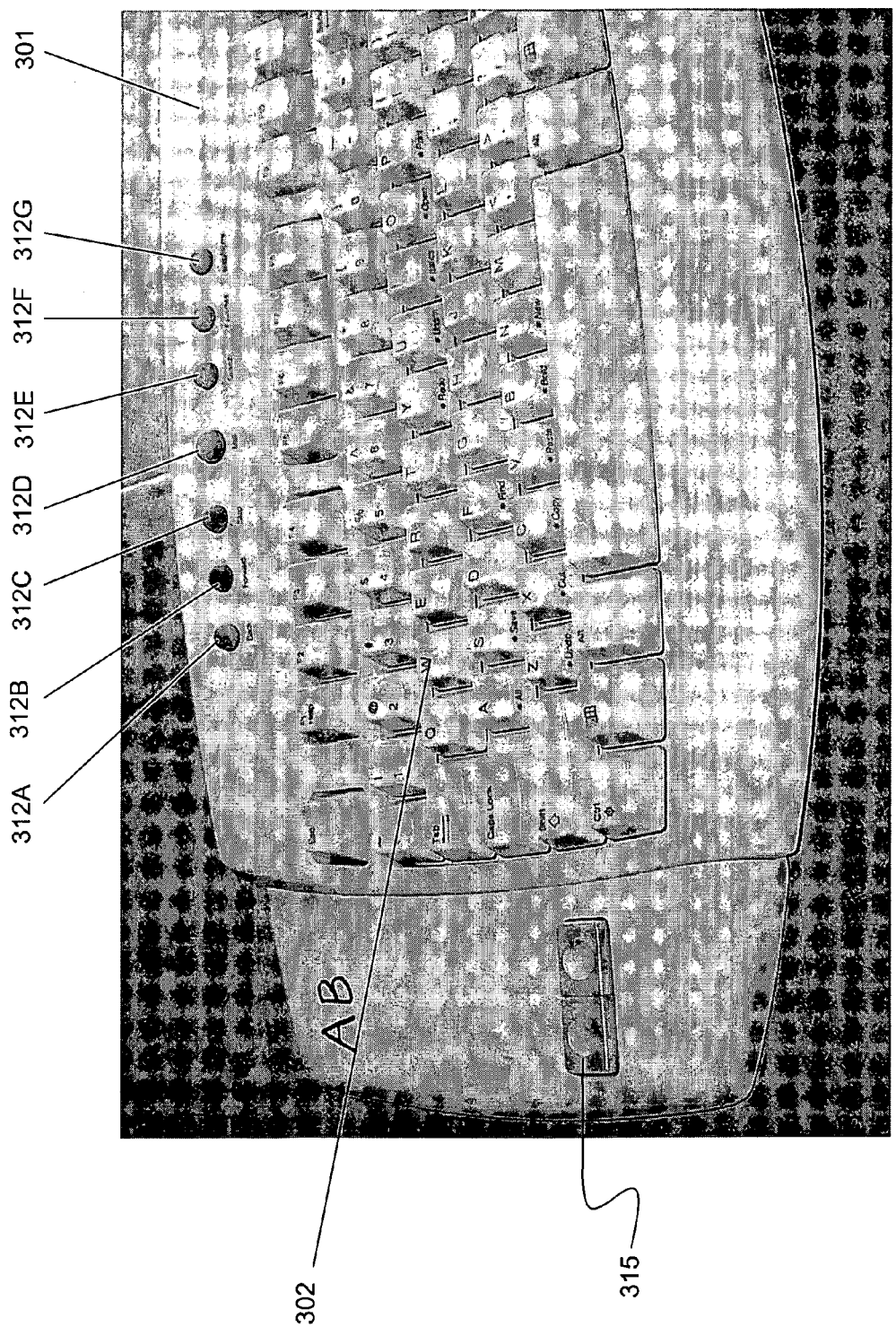

FIG. 18B shows a portion of another illustrative keyboard according to the present invention with auxiliary control inputs including buttons 312A-312G and touch sensitive control knob 314. The buttons 312A-312G each may have touch sensors. FIG. 18C shows a portion of yet another illustrative keyboard according to the present invention with a touch sensitive rocker switch 315 and buttons 312A-312G, each of which maybe touch sensitive.

FIG. 19 is a perspective view of an illustrative touchpad 2000 according to the present invention. This touchpad may be a conventional touchpad, without any modifications, currently available from Synaptics Corporation of San Jose, Calif. Touchpad 2000 is formed of touch sensitive surface (tablet) 2100 that senses two-dimensional position and contact area (surface area) of a finger of a user as that finger contacts and moves across the surface. In addition, touchpad 2000 contains buttons 2220, 2240, 2260 and 2280 peripherally situated to the touch sensitive surface. One or more of the buttons 2220, 2240, 2260 and 2280 may be touch sensitive. The output of the touchpad can be routed to a computer system such as shown in FIG. 1. In embodiments of the invention, a touchpad including its auxiliary controls can detect a physical presence (e.g., a finger) contacting a touch sensitive surface thereof, the physical presence representing an explicit user request to display a display widget on a display screen and/or to generate other feedback (e.g., acoustic, tactile). The feedback can provide information to the user such as status information, control functionality, and help text. The information may vary from application to application. In some embodiments of the invention, the position of the display widget on the display screen may track the movement of the physical presence across the touch sensitive surface.

As has been described, keys, buttons, knobs, rocker switches, or other auxiliary controls of an input device can be augmented with sensors that detect contact or extreme proximity of a physical presence including, but not limited to, a user's hand (e.g., finger, palm) or a stylus. Illustrative input devices have been shown and described previously including mice (FIGS. 4A-14B), trackballs (FIG. 15), game controllers (FIGS. 16 and 17), keyboards (FIGS. 18A-18C) and touchpads (FIG. 19). According to embodiments of the present invention such sensed signals can be used to provide the user with on-screen displays of status, state information, or other feedback relevant to the control that the user has touched.

FIG. 20 is a more detailed block diagram of computer 20 useful in describing a message routing system of according to an exemplary embodiment of the present invention. In FIG. 20, input device 43 provides a serial binary signal to serial interface 46. Input device 43 can include any of the input devices and their auxiliary controls described above that have touch sensors.

Serial interface 46 converts the serial binary signal from input device 43 into parallel multi-bit values that are passed to device driver 60. In many embodiments of the present invention, device driver 60 can be implemented as a software routine that is executed by CPU 21 of FIG. 1. In these embodiments, device driver 60 can be input device specific and designed to interact with a particular input device and its auxiliary controls based on a designated protocol. Thus, if input device 43 is a mouse, device driver 60 is a mouse driver that is designed to receive mouse packets generated by the mouse using a mouse packet protocol. If input device 43 is a keyboard, device driver 60 is a keyboard driver designed to receive keyboard scan codes indicative of a key being depressed or a touch sensor being touched.

Based on the designated protocol, device driver 60 converts the multi-bit values into device messages that are passed to operating system 35. These device messages indicate what events have taken place on the input device. For example if a touch sensor on a mouse has been touched, the message indicates that the particular sensor is being touched. When the touch sensor is released, a separate message is generated by device driver 60 to indicate that the touch sensor has been released.

The messages generated by device driver 60 are provided to operating system 35, which controls the routing of these messages. According to illustrative embodiments, the device messages are usually sent to a focus application 812. The focus application is typically the application that has the top-most window on the display.

In some illustrative embodiments, operating system 35 maintains a list of message hook procedures that have been registered with the operating system. In these illustrative embodiments, operating system 35 sequentially passes the device message to each message hook procedure on the list before sending the message to focus application 812. Such message hook procedures are shown generally as message hook procedures 810 of FIG. 20. Most message hook procedures simply evaluate the device message to determine if some action should be taken. After evaluating the device message, the message hook procedure returns a value to operating system 35 indicating that the operating system should pass the device message to the next procedure in the list. Some message hook procedures have the ability to "eat" a device message by returning a value to operating system 35 that indicates that the operating system should not pass the device message to any other message hook procedures or to the focus application.

The message hook procedures and the focus application use the device messages, especially those indicating that a touch sensor has been touched, to initiate a variety of functions that are discussed below.

For example, FIGS. 21 and 22 depict images of screens displayed by various applications of the present invention that utilize device messages generated based on signals from an input device according to illustrative embodiments of the present invention such as mouse 170 or trackball 220 of FIGS. 4A and 15, respectively. FIG. 21 depicts an image of a screen 320 that shows a virtual desktop 322. Virtual desktop 322 includes images of icons 324 and 326 as well as an open window 328. Open window 328 is associated with a word processing application known as Microsoft Word®, offered by Microsoft Corporation of Redmond, Wash.

In window 328, a caret 330 is positioned within a sentence of an open document. Caret 330 may be positioned by moving mouse 170 or ball 228 of trackball 220. In FIG. 21, caret 330 appears as a vertical line that extends between two smaller horizontal lines. Those skilled in the art will recognize that caret 330 can have many different shapes, and typically appears as an arrow on desktop 322.

The position of caret 330 within the sentence of window 328 causes a tool tip 332 to appear. Tool tip 332 indicates who entered the word that caret 330 is positioned over.

Window 328 also includes a tool bar 334 that includes drawing tools that can be used to draw pictures in the document of window 328.

According to exemplary embodiments of the present invention such as shown in FIG. 21, caret 330, tool tip 332, and tool bar 334 only appear in window 328 while the user is touching a portion of the input device such as an auxiliary control (e.g., button or button combination) assigned to provide a tool tip while in the word processing application. If the user is not touching the input device, caret 330, tool tip 332, and tool bar 334 disappear. FIG. 22 shows an image of display 320 when the user is not touching a portion of the input device. By eliminating tool bar 334, caret 330, and tool tip 332 when the user is not touching the input device, the present invention can reduce the clutter found in window 328 and make it easier for the user to read the document shown in window 328.

Those skilled in the art will recognize that the disappearance of caret 330, tool tip 332, and tool bar 334 when the user is not touching the input device can be controlled independently. Thus, the user may customize window 328 such that tool tip 332 and tool bar 334 disappear when the user releases the input device, but caret 330 remains visible. In addition, the rate at which items disappear and reappear can be controlled. Thus, it is possible to fade images off the display and to fade them back onto the display as the user releases and then touches the input device. In some illustrative embodiments of the invention, the fade-out period is 0.7 to 1.0 seconds to minimize distraction, and the fade-in period is 0.0 seconds for the caret, which appears instantly, and 0.3 seconds for toolbars. In certain embodiments, the fade-out time may be a variable configurable by a user with a preset default period.

FIGS. 23-25 show a series of illustrative display screens that include pull-down menus that can be displayed as a result of keyboard messages from keyboard 300 of FIG. 18A. In particular, in screen image 350 of FIG. 23, an application generates an active window 352 on virtual desktop 354 that includes an image of a pull-down menu 356. Pull-down menu 356 is associated with a menu heading entitled "Tools" found in a menu bar 358. Pull-down menu 356 is displayed in response to a keyboard message that indicates that the user is touching but not depressing one of the keys of numeric keypad 304 of keyboard 300.

In other exemplary embodiments, the user may move left and right across menu bar 358 by using the keys representing the numbers "4" and "6" on numeric keypad 304. As the user moves across menu bar 358 a different pull-down menu can be displayed for each respective menu heading. Specifically, by touching the key representing the number "4", the user causes a keyboard message to be sent to the application, which changes the display so that the menu heading to the left of the current menu heading in header menu 358 is displayed. Thus, if the pull-down menu for the menu heading "Tools" is currently displayed in window 352, touching the key representing the number "4" causes a pull-down menu associated with the menu heading "Insert" to be displayed. Similarly, the user can cause a pull-down menu to appear for a menu heading to the right of the current menu heading by touching the key representing the number "6" on numeric keypad 304. Thus, if the current pull-down menu is associated with the menu heading "Tools", and the user touches the key representing the number "6", the pull-down menu associated with the menu heading "Format" in header menu 358 will be displayed. This is shown in FIG. 24 where pull-down menu 360 for the menu heading "Format" 358 is displayed.

By touching the keys representing the numbers "2" and "8" on numeric keypad 304, the user can also move up and down within a pull-down menu such as pull-down menu 360. As the user moves through a pull-down menu, different items within the pull-down menu become highlighted. An example of a highlighted entry is entry 362 of FIG. 24, which highlights the entry "Tabs" of pull-down window 360 as the current entry. If the user touches the key representing the number "8" while entry 362 is the current entry, the application that receives the associated keyboard message highlights entry 364 located above entry 362 as the current entry. If the user touches the key representing the number "2" while entry 362 is the current entry, entry 366 below entry 362 is highlighted as the current entry.

FIG. 24 can also be used to describe another embodiment of the present invention. In particular, pull-down window 360 may also be activated by positioning the caret over the menu heading "Format" and depressing a select button on a pointing device such as mouse 170 or trackball 220 of FIGS. 4A and 15, respectively. The user may select an entry in pull-down window 360 by moving the pointing device downward through the list of entries. As the user moves the input device, individual entries in the list are highlighted.

In the prior art, pull-down menu 360 will continue to be displayed, even if the caret is positioned outside of the pull-down menu itself. The only way to make the pull-down menu disappear is to click on an area outside of the menu itself. However, according to an illustrative embodiment of the present invention, the application that produces the pull-down menu, removes the pull-down menu as soon as it receives a mouse message that indicates that the user released the pointing device. This improves user efficiency by reducing the movements the user must make to close the pull-down windows associated with header menu 358.

FIG. 26 is an image of a display screen that includes a radial menu 370 that is displayed according to another exemplary embodiment of the present invention. Radial menu 370 includes eight entries arranged in a circle 371 around a cancel button 372. Radial menu 370 may be manipulated by, for example, using keyboard 300 of FIG. 18A or by using the touch sensors on button 670 of the mouse of FIG. 10H.

Using keyboard 300, a focus application displays radial menu 370 when it receives a keyboard message indicating that a user touched one of the keys in keypad 304. To highlight a specific entry, the user touches a key in keypad 304 that is spatially related to the entry. For example, to highlight entry 373 of radial menu 370, the user touches the key representing the number "8", which is located directly above a center key representing the number "5" because the spatial positioning of the "8" key relative to the "5" key is the same as the spatial relationship between entry 373 and cancel button 372. To select an entry, the user depresses the key that causes the entry to be highlighted. To dismiss the radial menu, the user depress the "5" key.

To manipulate the radial menu using the touch sensors of button 670 on the mouse of FIG. 10H, the user simply touches the touch sensor that corresponds to an entry on the radial menu. Simply touching the corresponding touch sensor causes the entry to be highlighted. Depressing button 670 while touching the corresponding touch sensor causes the entry to be selected. The application determines that both events have occurred based on two separate mouse messages. A first mouse message indicates which touch sensor is currently being touched. A second mouse message indicates that the left button has been depressed.

Figure 27:
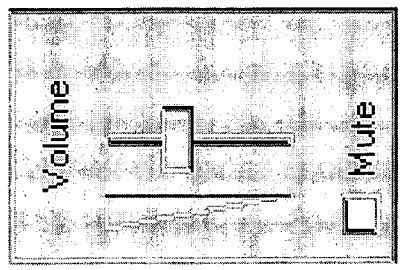
FIG. 27 shows an illustrative graphical user interface that may appear on a display screen according to an exemplary embodiment of the present invention.

According to illustrative embodiments of the invention, the use of touch sensitive controls and devices may be transparent to the user. The context of the situation may be indicated by the user's preparatory actions with the control, such as grabbing, touching, or approaching the control device. Referring to FIG. 18B, for exemplary purposes, assume that the current functionality of control knob 314 is to control the volume of audio associated with media (as opposed to controlling the volume for other system generated sounds). In this instance, if the user wishes to change the volume, the user may approach or touch the control knob 314 with his hand. Before the user activates the control knob 314 by turning the knob, a GUI for the volume control including the status of the volume in the form of a screen volume indicator can appear on screen as shown in FIG. 27. The user may then turn the control knob 314 to adjust the volume or move a pointer (e.g., caret or arrow) into the GUI while contacting, but not turning, the control knob 314, and change the volume using another control such as a key (e.g., arrow key), mouse or other pointing device. If the user touches the control knob 314 and then employs a key or pointing device to change the volume while the GUI is visible, the change in volume state may be shown instantly in the GUI or elsewhere on the display screen. When the user releases the control knob 314, the system knows the GUI is no longer needed, and it can cause the GUI to be dismissed without perceptible delay. In some embodiments, the GUI will remain visible as long as the pointing device continues interacting with or the cursor remains over the GUI.

In another illustrative embodiment of the invention, when the user approaches or touches the control knob 314, without activating the control, a display widget such as a tool tip can instantly be displayed on the display screen and identify the current functionality of the control knob 314. For example, a tool tip may indicate, but is not limited to, one of the following functions 1) tuning for a variety of different applications including audio and video applications; 2) volume control for media applications; 3) volume control for system generated sounds; and 4) control for numerous features which can have multiple settings (e.g., brightness, cropping, color, etc.). In other illustrative embodiments, as a user approaches a control, such as control knob 314, visual feedback may be provided on the actual control knob by an LED or LCD alone or in addition to the display widget on the display screen. In still further illustrative embodiments, acoustic or tactile (e.g., vibration) feedback may be provided alone, or in addition to visual feedback on the display screen, input device and/or control, or to each other. Consequently, the input device or control may be able to directly provide feedback (e.g., acoustic feedback) with or without involving or sharing the information with the host computer. In still further exemplary embodiments, one or more portions (e.g., top and side) of the control, such as control knob 314, may be able to independently detect contact or user proximity and generate unique messages for the host computer based on which portion of the control is being touched.

Figure 28:
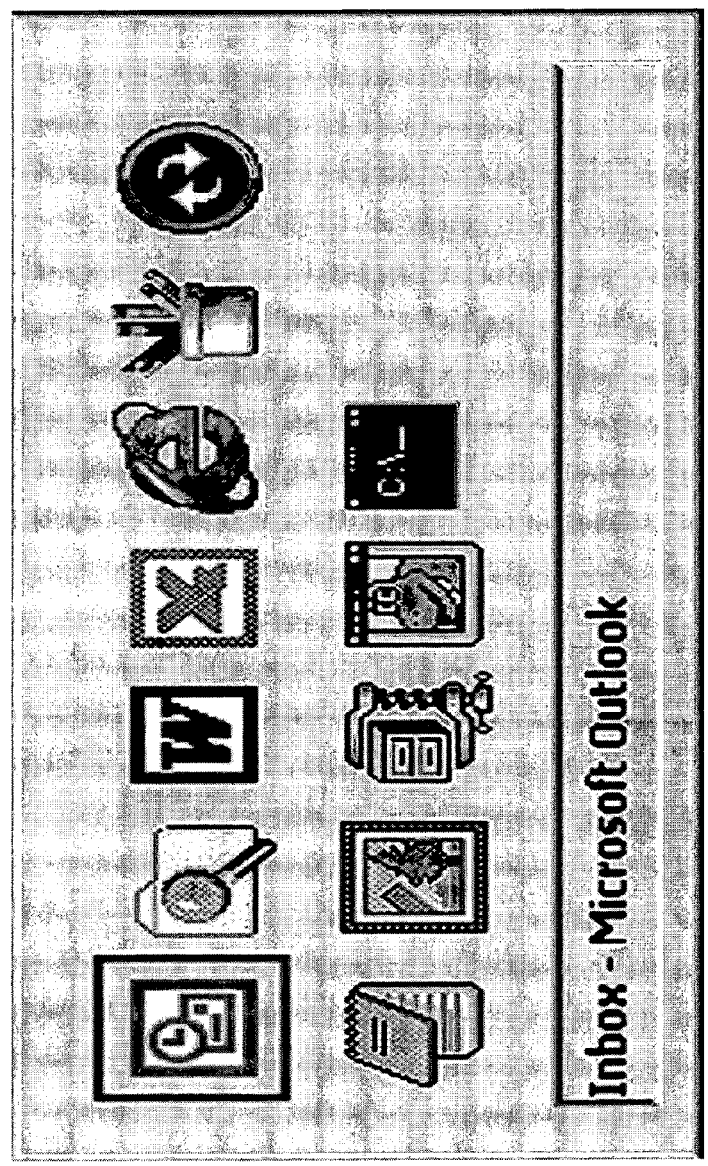
FIG. 28 shows an illustrative on-screen display that may appear on a display screen according to an exemplary embodiment of the present invention.

In another illustrative embodiment of the present invention based on the keyboard input device of FIG. 18C, a touch sensitive rocker switch 315 can be provided. In one context, the rocker switch 315 may allow a user to switch between applications similarly to using the combination of the Alt and Tab keys, currently used on operating systems such as Windows98® by Microsoft Corporation of Redmond, Wash. That is, the rocker switch 315 can allow a user to move forward and backward between running applications. Illustratively, when the user touches or approaches the rocker switch 315, an on-screen display showing an icon for each currently running application may be shown with the application in the foreground (at the top of the window stacking order) being highlighted as shown in FIG. 28. Pressing the rocker switch 315, can allow a user to move forward or backward between the applications in order to highlight the desired application to bring to the foreground of the display. The order may be determined in a number of ways, such as alphabetically or the last time each application was in the foreground of the display. Releasing the rocker switch 315 can cause the highlighted application to be selected and brought to the foreground of the display. It should be understood that the touch sensitive rocker switch 315 may used in numerous other applications including displaying different items responsive to user contact or extreme proximity to the switch and highlighting an item responsive to pressing of the switch and selecting an item from the list by releasing contact or moving away from the switch.

An illustrative implementation of various auxiliary controls for an exemplary keyboard input device and their context sensitive response to touch are listed below in Table 1. It should be understood that the various controls and responses may be applied to other input devices such as game controllers, trackballs, mice, touchpads, etc.

TABLE 1

| CONTEXT-SENSITIVE RESPONSE TO TOUCH | |
|---|---|
| MULTI MEDIA HOT CONTROL SET | |
| Volume Knob (e.g., control knob 314 in FIG. 18B) or Volume Up and Volume Down Keys | Touching can show volume setting GUI with clickable slider (e.g., FIG. 27) that can be used to adjust the volume of audio associated with media (as opposed to the volume for other system-generated sounds). Touching the volume knob or at least one of the volume up and down keys does not alter the volume; it only brings up the display. The display disappears at the cessation of touch (possibly after a brief time-out). Thus, the user can touch the volume knob or volume up and down keys to view the current volume setting, without necessarily changing it. |
| One or more of Play, Mute, Pause, Stop, Next Track, Previous Track, and Eject Keys | Touching can show a display widget including a multimedia control panel. The multimedia control panel may show graphical representation of the controls, plus other information such as album name, track name and length, etc. |
| APPLICATION LAUNCHING HOT CONTROL SET | |
| General Application Launch Button, or as replacement or in combination with the behavior listed for the controls below | Touching can show programmed content; with clickable area to launch specific applications, as well as other UI for adding, removing, or reorganizing applications that can be launched. |
| Mail Button | Touching can show number of new messages, brief summary of recent, unread high-priority messages, or bring an up Inbox window for the mail client. |
| Word Processing Application Button or Key Combination; Spreadsheet Application Button or Key Combination; Web Browser Application Button or Key Combination; File Explorer Application Button or Key Combination; Calculator Application Button or Key Combination | Glance into running application: Touching the key can bring application to the foreground, releasing the key sends the application to the background. If the user actually presses the key, the application can come forward and stay in the foreground when the user releases the key. If the application is not already running, touching the key may or may not launch the application. |
| WEB BROWSING HOT CONTROL SET | |
| Search Button | Touching can show most recently used searches or equivalent of past activities or search results. |

TABLE 1-continued

CONTEXT-SENSITIVE RESPONSE TO TOUCH

| | |
|---|---|
| Back Button; Forward Button | Touching can show thumbnail or history of previous/next websites visited. This feature can allow the user to see if the desired page was available on the visited list, and to see how many times it would be necessary to press Forward or Back to reach a desired page. |
| Stop or Refresh Buttons or Keys | Touching can show current page loading information (if any), including amount of page loaded and expected time to complete the download, as well as any status or error information, allowing the user to decide whether they want to stop. |
| Favorites Button | Touching can show most recently used favorites or UI for organizing favorites. |
| SYSTEM/GENERAL CONTROLS | |
| Application Switching Control: (e.g., Rocker Switch (e.g., rocker switch 315 in FIG. 18C), Dial Switch, or Previous App/Next App Keys, and Key Combinations) | Touching options may include: 1) Show/Hide the Task Bar when the user touches or releases the Application Switch Control; 2) Change the content of Task Bar, showing more or less detail, or emphasizing the Task Bar so it is clear how the user is changing applications, and the next or previous application to appear is more predictable; 3) Showing a separate on-screen display of running applications (titles, icons (e.g., FIG. 28), or thumbnails) so that the user can more efficiently navigate to the desired application. For example, the current on-screen display for the Alt-Tab key combination can appear when the user touches the control. |
| Sleep Control, Switch or Key Combination | Touching can cause GUI to be displayed showing options for sleep mode including Stand By, Log Off, Restart, and Shut Down. |
| Vertical and/or Horizontal Scrolling Controls | Touching can hide the scrollbars and/or other ancillary UI such as toolbars and status indicators while scrolling, or as long as the user maintains contact with the scrolling mechanism (e.g., wheel, touchpad). |
| Cut, Copy, Paste Key Combinations | Touching can show contents of the clipboard or collect-and-paste clipboard(s). |
| Stop (Esc), Help, New, Open, Close, Undo, Redo, Minimize, Minimize All Controls | Touching can 1) show status of alerts; or 2) show macros of programmed keys. |
| Spell Check Key Combinations | Touching can show/hide indicators of spelling/grammar issues, such as the "red squiggly" lines that are used to highlight spelling errors in Microsoft Word ®. |
| Save or Save As Key Combinations | Touching can show time, date, location, and file type for most recent save. |
| Print Control (e.g., Key Combination) | Touching can show current printer queue and job status for default printer(s). |
| "Welcome" Control | Touching can show log-on status. Log-on status information can include, among other information, log-on id, domain, status of login, and a log of any errors or delays encountered. |
| Fn (function key access) | Touching can show 1) on-screen display of mapped functionality of F1–F12 keys for given application; or 2) on-screen display for each F1–F12 key if Fn locked on. |
| Help function activated, any control | When help function is selected, context sensitive help can be displayed on touch of controls on the input device (e.g., mouse or keyboard). |
| Help finding a key | The keyboard help can direct user to a key by sensing where the user is on the keyboard and pointing the user to the right key. |
| Key Combinations | Touching keys in combination can display the key combination function (e.g., Ctrl key + c key = copy). It might also show status or state information associated with the command. For example, the Ctrl key + c key could show the current clipboard contents (or alternatively, the clipboard contents that would result if the user were to execute the command). |
| Context Menu Key | Touching can show the right-click context menu for the current cursor or pointer position, which may change as the user moves the mouse cursor or pointer. |
| ScrollLock Key; NumLock Key; Caps Lock Key | Touching keys can show lock status, (i.e., on or off). Touch sensitive feature may be used to replace LEDs. |
| GAME CONTROLS | |
| Buttons, Keys | Touching specific buttons or keys can show maps, tools, views, etc. |
| Controls | Touching specific control can show its function. |
| MAIL CONTROLS | |
| Reply, Forward, Send Controls (e.g., Keys | Touching control can 1) show status of alerts; 2) show macros of programmed keys; or 3) show other mail status information as detailed as the Mail application launch key described above including number of new messages, brief summary of recent, unread high-priority messages, or bring an up Inbox window for the mail client. Touching the control might also show additional information specific to a current message that the user is contemplating replying to, such as showing other recent messages sent to the same recipient. |

TABLE 1-continued

CONTEXT-SENSITIVE RESPONSE TO TOUCH

NUMBER PAD

| | |
|---|---|
| +, −, /, *, = Keys | In spreadsheet or word processing application, after user has selected range of cells (e.g., column), touching an operation key can perform the operation or show what result of operation would be without actually inserting it into the spreadsheet. |
| NumLock Key | Touching can show current state of numeric keypad lock. |

Below, Table 2 describes illustrative techniques for context-sensitive response to touch on an exemplary mouse input device according to the present invention.

TABLE 2

| INPUT CONTROL | CONTEXT-SENSITIVE RESPONSE TO TOUCH |
|---|---|
| Right mouse button or portion thereof | A small raised area in the corner of the right mouse button can be touch sensitive. The user can use the right mouse button as usual if he or she does not touch this area. This raised area looks different and invites touching, leading to discovery of right-click functionality. If the user touches this area, the right mouse context menu can appear. As the user moves the mouse around while touching this area, context menus for the different objects can appear. The user can then click the right mouse button per usual to interact with the menu. |
| Wheel | Touching shows current configuration and customization algorithms for how the wheel can be used (e.g., lines per notch for scrolling, scrolling acceleration, assignment of middle-button-click functionality). Touching can also show or hide the scroll bar. |

Figures 29A, 29B:
FIGS. 29A and 29B show illustrative tool tip visual feedback that may appear on a display screen according to exemplary embodiments of the present invention.

In addition to many of the types of visual feedback that may be provided on a screen in response to user contact with a touch-sensitive control, another possibility is to display a standard tool tip, such as those illustrated in FIGS. 29A and 29B when key combinations or other controls are set to perform the copy (e.g., Ctrl key+c key together) and paste (e.g., Ctrl key+v key together) functions, respectively. That is, when the user touches the "Ctrl" key and "c" key together, the tool tip "Copy" displayed in FIG. 29A may appear on the screen and when the user touches the "Ctrl" key +"v" key together, the tool tip "Paste" shown in FIG. 29B may appear on the screen.

Typically, the on-screen display can be placed near the current cursor or pointer (e.g., caret) position regardless of the input device that the user touches. For example, a keyboard tool tip could appear next to the cursor. Popping up the on-screen display to the right of and above the current cursor position can be beneficial, since the on-screen display does not conflict with traditional tool tips which appear when the user dwells with the pointer over an icon (tool tip appears to the right of and below the pointer or cursor) in the Windows® operating system by Microsoft Corporation of Redmond, Wash. The tool tip can follow the cursor or pointer as the user moves the cursor or pointer with a pointing device (e.g., mouse), or it can remain stationary at the point where it initially appears. Maintaining the tool tip where it appears rather than moving the tool tip with the cursor is easier to implement and more efficient, and would likely be well accepted by users. According to other exemplary embodiments of the present invention, the display widget may be displayed at the center of the screen, at the center of the currently active ("focus") application or widget (e.g. a text entry box), at the bottom of the screen, or above the system tray icons.

Figure 30A:
FIGS. 30A and 30B show illustrative visual feedback that may appear on a display screen according to exemplary embodiments of the present invention.
Figure 30B:
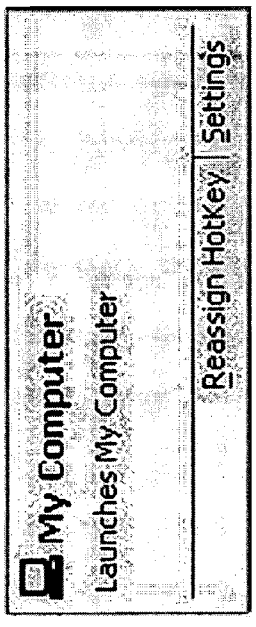

FIGS. 30A and 30B show other exemplary display widgets (on-screen displays) exemplifying keyboard control functionality on a per application basis that can be displayed in response to a user touching programmable keyboard hot keys and function "F" keys according to illustrative embodiments of the present invention. If a user simply touches, but does not activate, a key, the on-screen display may indicate what the key is and/or what it does—without actually performing the function. FIG. 30A shows an exemplary on-screen display of a keyboard hot key GUI including selectable (e.g., by mouse or other pointing device) options to customize or view settings of the keyboard hot key in response to a user touching a key. That is, a user may click on the "Reassign HotKey" area of the GUI to see the current function of the hot key (which may be a combination of keys) and reassign the hot key functionality. FIG. 30B provides another exemplary on-screen display of a keyboard hot key GUI including selectable to customize or view settings of the keyboard hot key in response to a user touching a key. FIG. 30B differs from FIG. 30A in providing more detailed information to the user as to what the key is and what it does (e.g., launches My Computer application). In some embodiments, the touch-triggered GUI can receive the keyboard focus as soon as the user touches the associated control. This would allow the user to immediately strike the "R" key, in the "Reassign HotKey" example above, to activate the alternative function. In other embodiments, the touch-triggered GUI may not receive the keyboard focus. The user would have to click on the GUI with the mouse, or switch to the keyboard focus using the Alt+Tab key combination for example, or another method of switching between top-level windows. This latter embodiment prevents the touch-triggered GUI from receiving keyboard input that the user may not intend for it to receive. The preferred embodiment depends on the details of the specific input device, touch-sensitive control on that device, the current application, and possibly user preferences.

Figure 31:
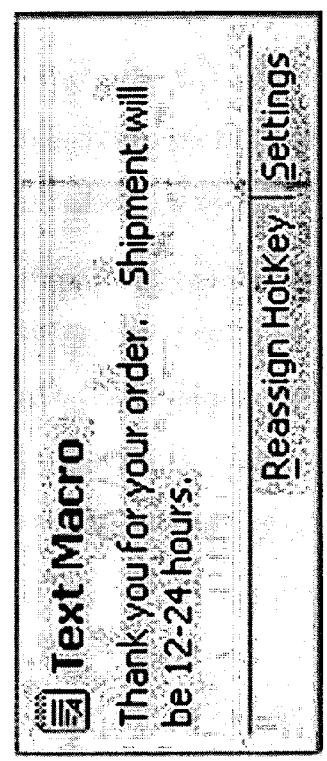
FIG. 31 shows illustrative visual feedback that may appear on a display screen according to an exemplary embodiment of the present invention.

In another exemplary embodiment of the present invention, each hot key may be assigned a text macro, where activating the hot key causes a block of text to be inserted, for example where the cursor is located on the screen. When used in this context, touching a hot key displays at least the beginning or another portion, if not all, of the text macro assigned to the hot key as shown in FIG. 31. The on-screen display window may automatically resize according to the amount of text assigned to the text macro in order to display all the text. This context may also be used in conjunction with scrolling controls such that a user, while touching the hot key assigned the text macro, may scroll through the text.

As mentioned previously, according to some exemplary embodiments of the present invention, acoustic or tactile feedback may be employed. Acoustic or tactile feedback can be used in combination with or separately from visual feedback on the display. In some cases, visual feedback may not be appropriate, or acoustic feedback may be desired because of the currently running application, the input device that is currently being used, or user preference.

According to certain embodiments of the invention, acoustic feedback, for example, appropriate cue tones or other sounds could be generated, as the user touches a control. A desired audio cue tone may be mapped to a specific function or control. Volume, pitch, and timbre could be adjusted to produce appropriate cues that mimic desired sounds, such as voice-generated announcement of a control function. Cue sounds may be generated by taking parametric sound event requests and sequencing them using MIDI wavetable synthesizer 662 through audio generator 640 (illustratively the Creative Labs AWE64 Gold card sound board) (see FIG. 6). The specific techniques for establishing correct audio parameters for each audio cue, properly synthesizing the audio cues, and associating cues with corresponding controls and/or functions have been omitted for simplicity as they are all readily apparent to those skilled in the art and do not form part of the present invention.

Acoustic feedback to identify functionality and other information may be particularly useful for gaming applications and products such as the MS Game Voice™ by Microsoft Corporation of Redmond, Wash. For example, gaming products may include a headset microphone combination attached to a puck. A puck allows a user to selectively talk to multiple combinations of people and teams with whom he or she is playing. Each person may be automatically assigned a code (1,2,3 . . . ) and a team (A,B, C . . . ). A problem may arise when the player has to remember which code corresponds to which player and team. When the user wants a reminder to whom a button is assigned, the user may touch a control (e.g., number key) and receive acoustic feedback of the name of the person assigned that code via their headset.

In one exemplary embodiment of the present invention identified in Table 1, multiple touch areas on an input device can be used to page backwards and forwards through web pages provided by an Internet browser. Examples of input devices having multiple touch sensitive areas useful in paging backward and forward include, among others, the mice of FIGS. 10C, 10D, 12A, 12B, 13A, 13B, and 13C. In FIG. 10C, touching region 624 and then region 626 initiates a page backward function and touching region 626 and then region 624 initiates a page forward function. In FIG. 10D, touching region 637 and then region 634 initiates a page backward function and touching region 634 and then region 637 initiates a page forward function. In FIGS. 12A and 12B, touching regions 722 and 724, respectively, and then regions 720 and 728, respectively, initiates page forward functions and touching regions 720 and 728, respectively, and then regions 722 and 724, respectively, initiates page backward functions. In FIGS. 13A, 13B, and 13C, touching regions 734, 738, and 746, respectively, and then touching regions 736, 742 and 748, respectively, initiates page forward functions and touching regions 736, 742, and 748, respectively, and then touching regions 734, 738, and 746, respectively, initiates page backward functions.

Note that a mouse according to an illustrative embodiment of the present invention can be configured so that paging functions are initiated simply by touching one touch sensor instead of touching a sequence of two touch sensors. Thus, in FIG. 10C touching region 624 can initiate a page forward function and touching region 626 can initiate a page backward function. Similarly, touching region 734 of FIG. 13A can initiate a page forward function and touching region 736 of FIG. 13A can initiate a page backward function. In this context, the touch sensors of the present invention provide the functionality of the side switches found in U.S. patent application Ser. No. 09/153,148 filed on Sep. 14, 1998 entitled "INPUT DEVICE WITH FORWARD/BACKWARD CONTROL", the inventors of which were under a duty to assign the application to the assignee of the present application.

Figure 32:
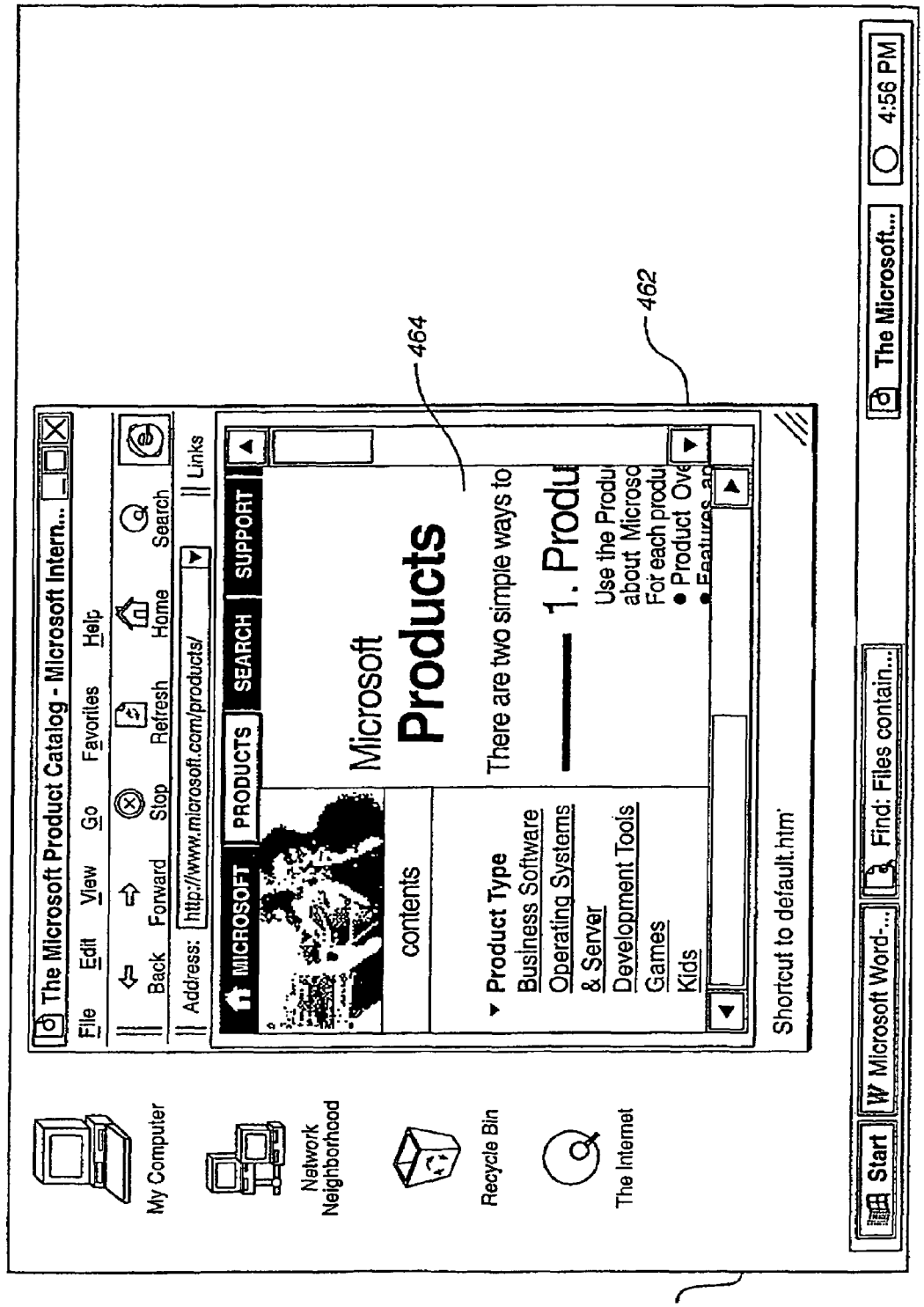
FIG. 32 is an image of an illustrative screen display showing a web browser that includes a current page.
Figure 33:
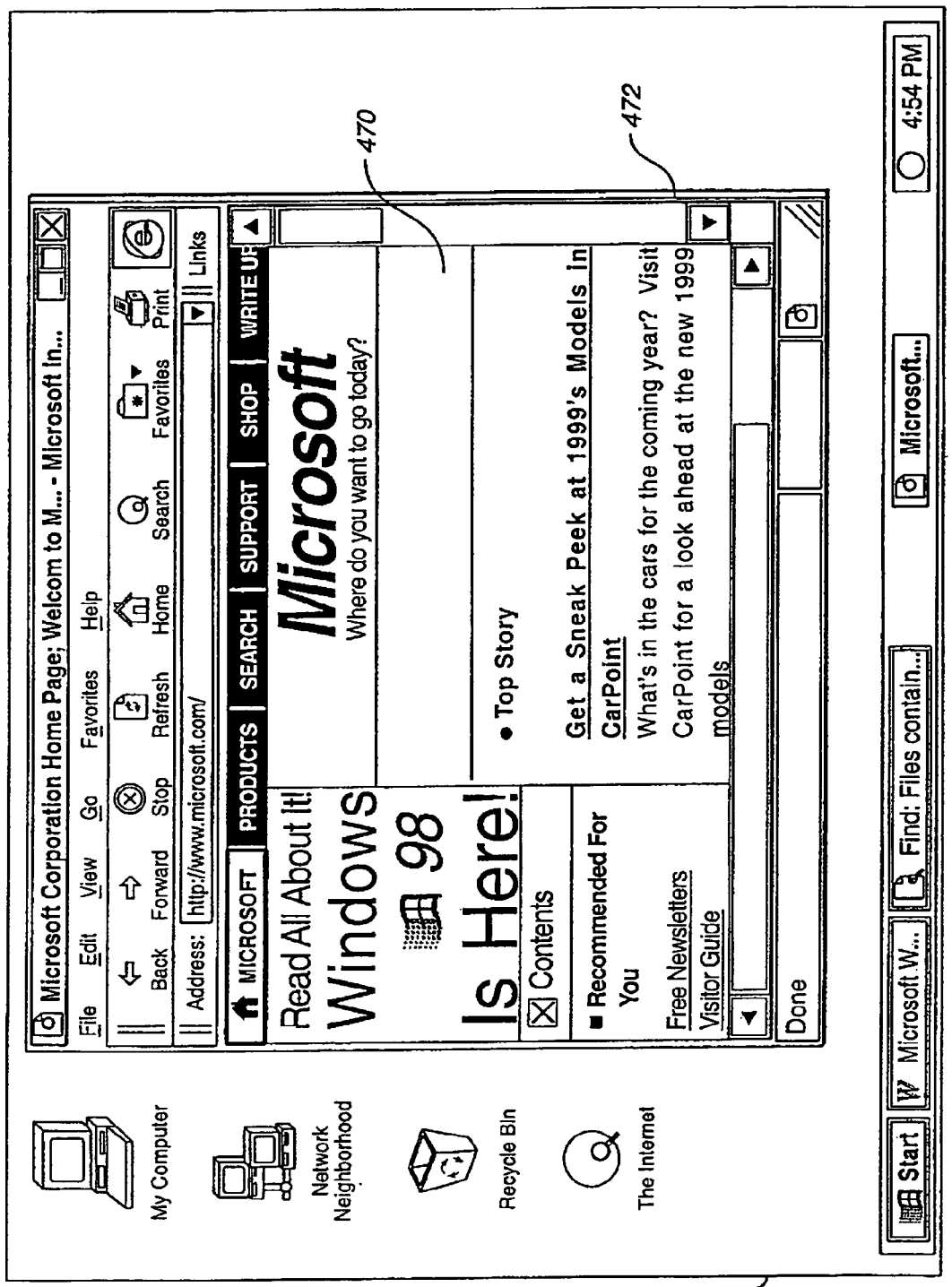
FIG. 33 is an image of an illustrative screen display showing a web browser that includes a past page.
Figure 34:
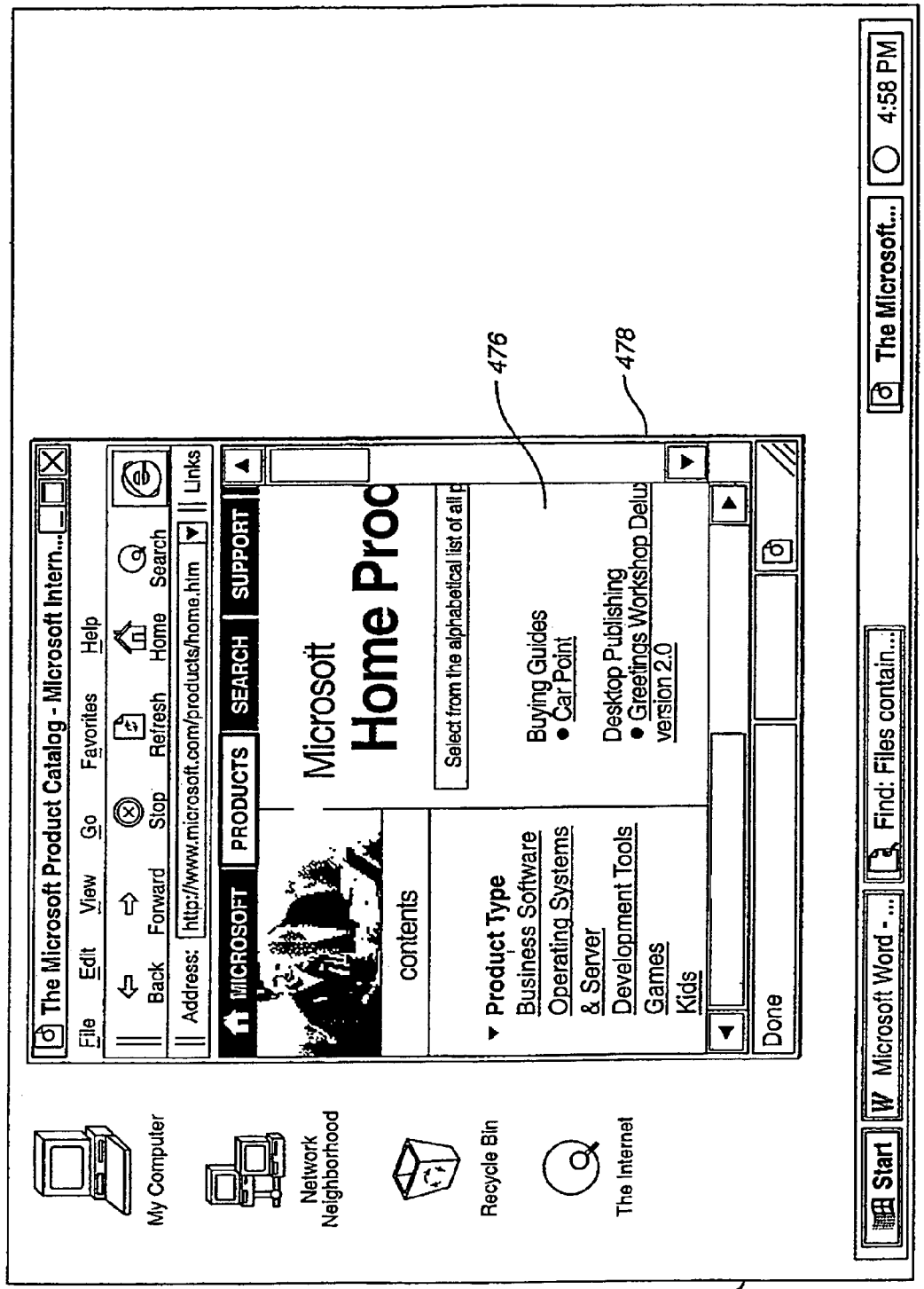
FIG. 34 is an image of an illustrative screen display showing a web browser that includes a next page.

The paging functions performed using these touch areas are shown in FIGS. 32-34. In FIG. 32 display 460 shows an Internet browser window 462 that depicts a current page 464. A user can page backward to the Internet page that was displayed before current page 464 to display a past page 470 of FIG. 33, which is shown in Internet browser window 472. The user can move forward to a next page 476, shown in browser window 478 of display 480 in FIG. 34, using the touch sensor combination described above. In order to be able move forward to next page 476, the user must at some point move backward from next page 476 to current page 464.

It should be understood that the various responses to making contact with or being in extreme proximity to a touch sensitive control may be used in combination. For example, when a user first makes contact with a button, the button's function may be displayed. In one implementation, if the user maintains contact with the button for more than a prescribed amount of time (e.g., five seconds), more detailed status information may be displayed or a GUI may be available to the user. Alternatively, successive touches of the same button within a predetermined period of time may cause different types of information to be displayed such as the button functionality followed by a GUI. Tactile or acoustic feedback may also be provided following an initial touch with a display of the same or more detailed information following a second touch in a predetermined time period or after touching has been detected for a prescribed time period.

In responsive to detection of a user in contact with or proximate to an input device or auxiliary control of the device, the on-screen display of a display widget may occur instantaneously. Frequently, it may be desirable to delay the appearance of the display widget on the screen slightly so that if a user activates, rather than merely touches, the control or device to activate a function, for example, the display widget will not rapidly appear and disappear from the screen. Delaying the appearance of the display widget a predefined amount of time can prevent unnecessarily displaying of a display widget with tool tip information for example, to a user who is familiar with the active application and the operation of an input device and its auxiliary controls and who rapidly activates the device or its control (e.g., depresses a button) to activate a function. Several illustrative techniques according to the invention are described below that address controlling the display.

In one embodiment of the invention, a brief time period on the order of 0.3 seconds may be employed. In this instance, if a user makes contact with, but does not activate, a key or other control within the brief time period, then the on-screen display appears. If the user activates the control before the expiration of the brief time period, the on-screen display would not be displayed in response to the user contacting the control.

According to some embodiments of the invention, activation of the control (e.g., turning a knob) causes the state of the function controlled (e.g., volume) to change and may display a GUI (e.g., volume setting) as the user changes the state (e.g., volume setting). In contrast, when touching, but not activating, the control for the entire brief period, a GUI representing the existing state (e.g., current volume) of the function may be displayed without causing the state to be changed.

Similarly, according to embodiments of the present invention, a brief time period may also be used to control disappearing or fading out of the on-screen display when a user ceases contact with a control. In this instance, the on-screen display remains visible during the brief time period, at the expiration of which the on-screen display disappears or fades out. If the user again touches the control before the brief time period expires, the on-screen display remains visible. It should be understood that the same type of time periods may be applied in embodiments of the present invention in which detecting contact of a control by a user causes a display widget to be dismissed (i.e., disappear or fade-out) and ceasing contact of the control causes the display widget to reappear or fade-in.

According to illustrative embodiments of the invention, when a display widget including a tool tip or other information appears, schemes for such display can be based on a number of criteria including the control, timeout and other information such as mouse movement. FIGS. 35A-35C graphically depict three illustrative alternatives as to the timing and conditions involved with a touch sensitive mouse that causes a display widget such as a tool tip to appear on a display screen.

FIG. 35A shows a timing diagram for an exemplary embodiment in which a button tool tip is displayed on the display screen following a brief time-out ($\Delta t$). The time-out suppresses the button tool if the user briefly touches the button, briefly touches the button before activating, or accidentally brushes against the touch sensor, as shown with the button being touched for less than the brief time-out period ($\Delta t$). Also, as shown, when a button is touched for a period longer than the brief time-out ($\Delta t$), the tool tip becomes visible. The tool tip remains visible until the user releases contact with the button. In this example, movement of the mouse has no impact on the display of the tool tip.

According to the timing diagram shown in FIG. 35B of an illustrative embodiment of the invention, the button tool tip is not displayed when the user is touching the button (not activating) and moving the mouse. If the user continues to contact the button and stops moving the mouse for the time-out period ($\Delta t$), the button tip is displayed. As in FIG. 35A, the tool tip remains visible until the user releases contact with the button.

In the timing diagram depicted in FIG. 35C, if, when the user touches the button and the mouse is still, the user continues to touch the button and not move the mouse for the time-out period ($\Delta t$), the tool tip is displayed. As in FIGS. 35A and 35B, the tool tip remains visible until the user releases contact with the button.

Figure 36A:
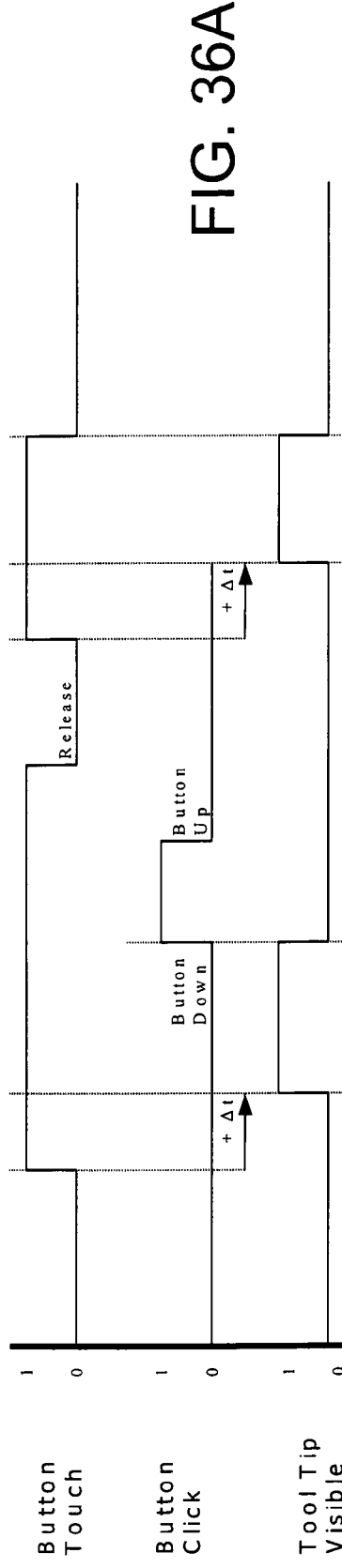
FIGS. 36A and 36B show illustrative timing diagrams for controlling the display of a tool tip according to illustrative embodiments of the present invention.
Figure 36B:
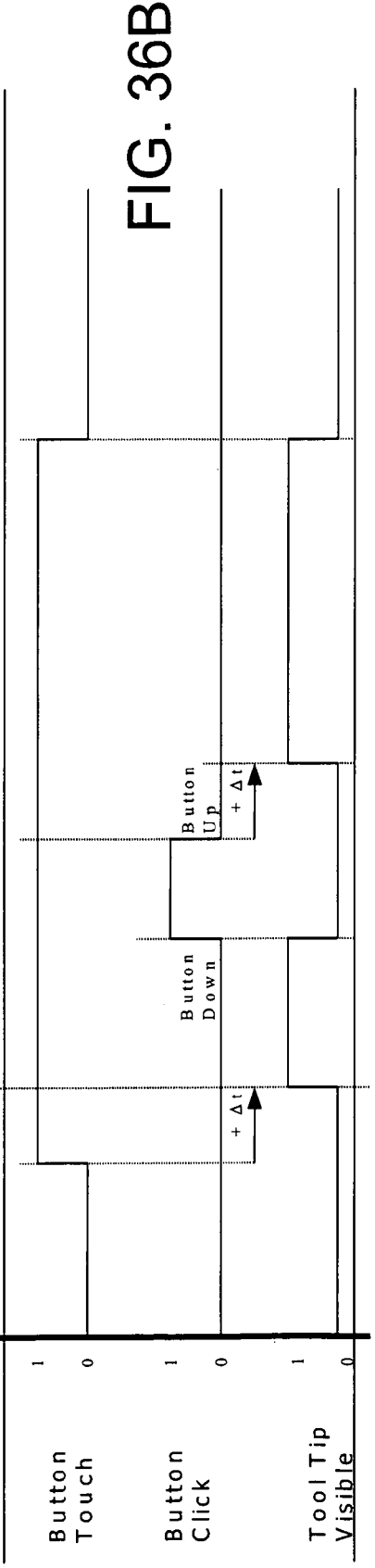

Another aspect of display schemes for the touch sensitive input control display involves the response of a tool tip or other display widget to user activation of the button or other input control. After the user activates the control, the user may no longer desire the feedback (of the resulting action or otherwise). For example, at the time that a user clicks a button (button down event), the button tool tip can instantly disappear (or fade out). Also, the button tool tip may reappear or stay hidden after a button up event occurs if the user maintains contact with the button. The computer system can also display visual feedback to associate the button click with the information displayed in the tool tip before the tool tip disappears. According to an illustrative embodiment as depicted by the timing diagram shown in FIG. 36A, after a button down event caused by a button click, the button tool tip will not reappear until a user releases the button and again touches, but does not activate, the button for time period $\Delta t$. Stated differently, following activation of a button, the button tool tip will not be displayed until after the next rising edge of the button touch sensor as shown in FIG. 36A. According to another embodiment of the present invention depicted by the timing diagram in FIG. 36B, after a button down event followed by a button up event, the button tool tip reappears after the time-out $\Delta t$ as long as the user continues to maintain contact with the button.

Other embodiments of the invention involve handling simultaneous contact with multiple controls on an input device. If a user touches one control while maintaining contact with a second control, the on-screen display or other feedback for the second control should be generated. Alternatively, certain functions can be defined by a combination of controls, for example, key combinations. In this instance, the tool tip of the combination (e.g., key combination) is displayed when both keys are simultaneously touched but not activated, which will override the tool tip, if any, associated with the first key contacted. If the user releases one of the controls, the on-screen display may be dismissed in its entirety, or the feedback for the other touched control can be reinstated.

In another embodiment of the present invention, once the on-screen display in the form of a GUI has appeared or faded in, the GUI may remain visible if the cursor or pointer (e.g., by movement of a mouse) has been located therein, even if the user ceases contact of the control (e.g., button of a touch sensitive mouse) that caused the display of the GUI. In this instance, the GUI may eventually disappear in response to movement of the cursor (e.g., movement of a mouse) outside of the GUI, activation of another control or after a predefined period (e.g., 5 seconds) of inactivity in which no input is received by computer such as movement of a mouse.

According to illustrative embodiments of the invention, an on-screen display may be faded-in and out using an animated transition. It should be understood that techniques for controlling appearance and disappearance of an on-screen display may be used alone or in combination. An embodiment of the invention providing animated transition is described below with respect to FIG. 37.

Figure 37:
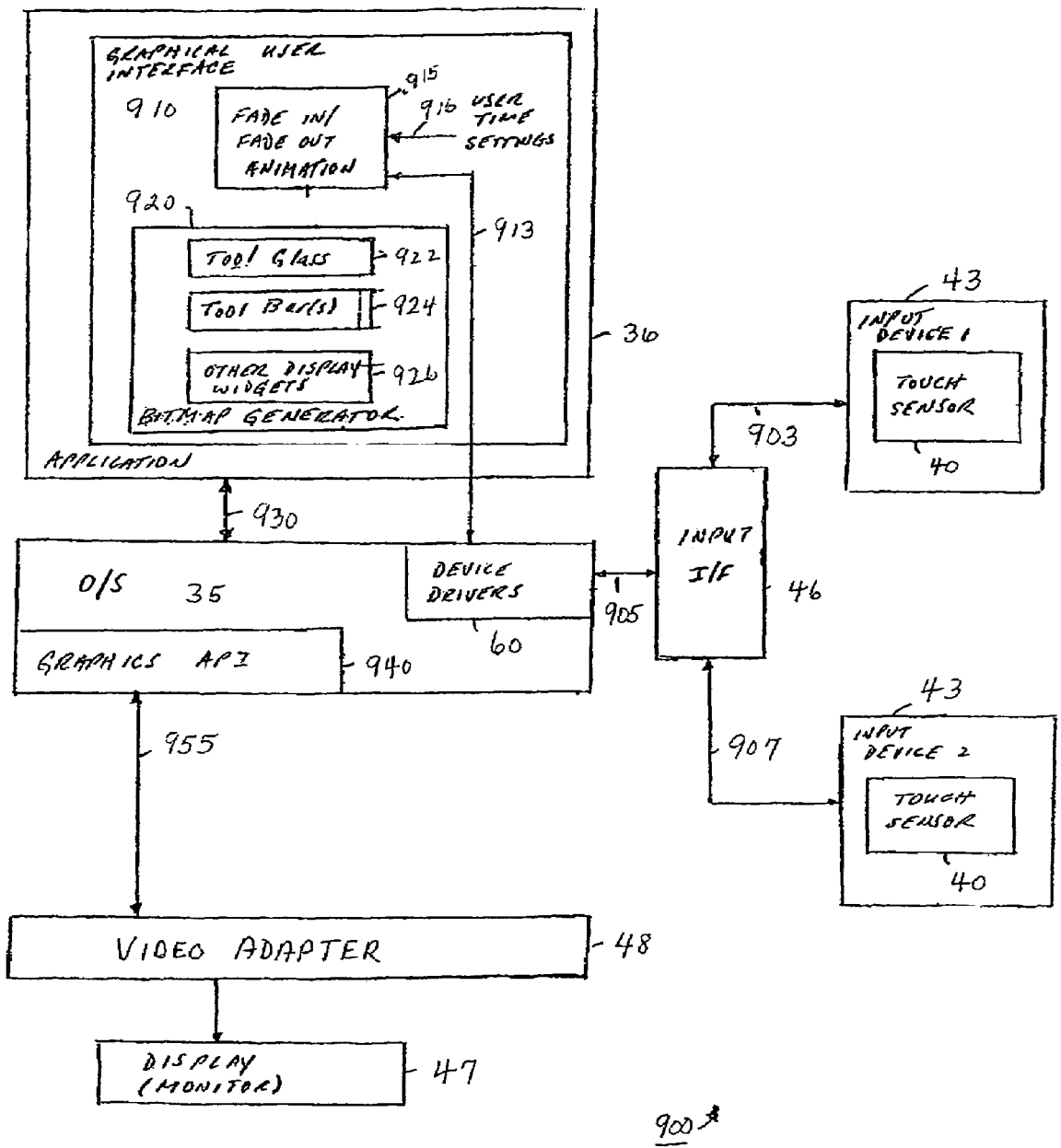
FIG. 37 depicts simplified high-level block diagram 900 of software and hardware components, situated within PC 20, that collectively form an illustrative implementation of the present invention.

FIG. 37 depicts simplified block diagram 900 of high-level software and hardware components, situated within PC 20, for displaying and dismissing, on an on-demand basis, a display widget such as a Tool Glass sheet, or toolbar. As shown in FIG. 37, these components include application 36, operating system 35, video adapter 48, display 47, input interface 46, and input devices 43. Application program 36 (e.g., a word processing or spreadsheet program), can include GUI 910 therein and within the GUI, fade-in/fade-out animation process 915 and bitmap generator 920, the latter including Tool Glass pattern 922, toolbar pattern(s) 924 and other display widget pattern(s) 926. Other components include, within operating system 35, input device drivers 60 and Graphics API (application programming interface) 940.

The touch outputs provided by input devices 43 can be applied, as represented by leads 903 and 907, respectively, to input interfaces 46. These interfaces can produce separate signals reflective of whether contact is then being sensed or not by the contact sensor of each touch sensitive component (e.g., auxiliary control) of each input device. These signals may be routed, as represented by lead 905, to input device drivers 60 that form a component within operating system 35. The device drivers interpret the signals produced by the input devices and, in response, generate appropriate events. With respect to touch, these events can specify the particular input device and the state of the corresponding touch sensor, e.g., whether hand contact is detected. These events can be passed by operating system 35 to application 36 and, ultimately within the application, to GUI process 910. Within this process, the events are processed by fade-in/fade-out animation process 915. The animation process, in response to the occurrence of a state transition of each input device, i.e., whether that device has just started sensing hand contact or has just ceased sensing such contact, and whether a display widget (e.g., Tool Glass or toolbar(s)) is then being displayed or not, will generate a predefined animation sequence to either controllably fade-in or fade-out the display widget.

Bitmap generator 920 stores predefined patterns 922, 924 and 926, typically texture maps, for the various display widgets, including the Tool Glass sheet, predefined toolbar(s) and/or other display widgets, respectively. These patterns are typically stored as separate files within the application. As application program 36 is invoked, the application, during initialization or after any change to the widget, downloads these patterns to Graphics API 940 via line 930 which, in turn, may route these patterns to a graphics accelerator (not shown) for local storage therein as texture maps. Alternatively, this downloading may be managed by a service provided by operating system 35.

During subsequent display, the accelerator will read these maps from its local store, polygonally fill these maps as appropriate, and render resulting filled patterns on display 47. Once these maps have been downloaded, then, for either a controlled fade-in/fade-out operation, animation process 915 changes an alpha-transparency value at which the graphics accelerator will render a corresponding filled pattern for a display widget. For a toolbar, the alpha-transparency value is varied across a full range of transparency values (i.e., between approximately $0\alpha$ and $1.0\alpha$, on a linear scale of $0$-$1\alpha$ where $0\alpha$ is fully transparent and $1.0$ is fully opaque). For a Tool Glass sheet, the alpha-transparency value is varied across a range of typically $0\alpha$ to approximately $0.7\alpha$, such that, even with the Tool Glass sheet rendered at its maximum opacity, underlying document objects are still visible (which some obscuration) through the sheet.

In essence, for a fade-in or fade-out operation, animation process 915 will issue a series of instructions over a predefined interval of time, specifically one such instruction for each different display frame, to successively change the alpha-transparency value with which a particular display widget is to then be displayed. These instructions will be issued, as also represented by line 930, to operating system 35, which, in turn, will pass these instructions to Graphics API 940 and ultimately to a graphics accelerator.

Fade-in should occur over a relatively short interval of time, such as on the order of approximately 0.3 to 0.5 seconds. However, so as not to distract a user, fade-out should occur over a relatively long interval, such as on the order of approximately 0.7-1.0 seconds. During these intervals, particularly on fade-in, the alpha-transparency values are generally varied in a non-linear fashion. Empirically, to utilize a conventional slow-in/slow-out technique commonly used in screen animation has been chosen. With this technique, the opacity initially changes rather slowly from being substantially, if not, totally transparent (i.e., essentially invisible) to an intermediate value, then increases rather quickly to another intermediate value with further increases then slowing once again until a maximum opacity (either, e.g., $1\alpha$ or $0.7\alpha$ for a toolbar or Tool Glass sheet, respectively) is eventually reached. This results in an approximately "S" shaped curve for opacity as a function of time. The same transparency variations are used for fading-out a display widget (though in a reverse direction). Clearly, other time-based opacity functions, such as a linear function, can be used to vary the opacity during the fade-in and fade-out intervals. Ultimately, the particular function(s) chosen (with possibly a different function being used for fade-in versus fade-out and, in fact, different such functions can be used for different display widgets, if desired) will likely be empirically determined through appropriate user testing.

Furthermore, a human eye exhibits increased sensitivity to certain colors, such as, e.g., red tones, over others, such as blue tones, for a common luminance. Hence, fading-in a display widget that contains any of the former colors, even at relatively low luminance, could be potentially distracting and more so particularly as these colors become brighter. To avoid such distraction, the display widget could be represented by several different texture maps of different or varying coloration and luminance—particularly for color(s) to which the human eye is most sensitive—until a final map with desired coloration and luminance is displayed. In that regard, a monochrome texture map for this widget could be initially displayed, with texture maps for the same widget but having desired coloration with increasing luminance (or even different coloration for that matter) then being rendered at appropriate times during fade-in, until at the end of the fade-in period, a texture map having a final coloration and luminance is rendered. Fade-out could be accomplished in a similar, though reverse fashion. For example, a display widget could fade-out using a succession of colored texture maps, of decreasing luminance, to a monochrome map which itself then fades out to total transparency, or, at the inception of fade-out, change to a monochrome map of the widget and from there fade-out to total transparency.

If a graphics accelerator is not used, then, as symbolized by line 955, Graphics API 940 can provide graphics output directly to video adapter 48 (specifically a standard video card, not shown, therein), which, in turn, will generate appropriate video signals and apply those signals to display 692. In this instance, the computer system would need to be sufficiently fast to implement the appropriate graphics capabilities, that would have been provided by the graphics accelerator, in software. Furthermore, where fade-in and fade-out graphics capabilities are not supported, the display and dismissal of display widgets could occur through other visual techniques. These techniques include, e.g., simply translating the widget by sliding or shuffling it onto the screen from an off-screen position; instantly and completely displaying or dismissing the widget; rotating the widget (if, e.g., a toolbar is on a 3-D surface that rotates into place) and/or zooming in or out interface widgets or portions of a document. However, with these techniques, the display widgets such as the toolbars and the Tool Glass sheet are constrained to being displayed fully opaque. Any of these techniques could also be used along with fading with a graphics accelerator that supports alpha-transparency.

Although alpha-transparency capability is supported by a wide variety of currently existing graphics accelerators, this capability can be readily simulated in software, in a well-known manner, by conventional 2-D (two-dimensional) or 3-D (three-dimensional) graphics APIs, such as D3D (which is a 3-D graphics API currently produced by Microsoft Corporation as a standard component of a WINDOWS® operating system), OpenGL (which is currently available in the art) or GDI (which historically is only a 2-D low-level graphics processing layer currently produced by Microsoft Corporation and also incorporated as a standard component of a WINDOWS® operating system).

Instances can arise where a display screen is to simultaneously show both a toolbar(s) and a Tool Glass sheet (or other combinations of display widgets). In these instances, unwanted interactions can arise that would cause both widgets to fade-in or out. To prevent these interactions and attendant user frustration, an appropriate decision process, well within the skill in the art, would be incorporated into animation process 915 to then permit only one, rather than both, of these display widgets to fade-in or out. For example, if both widgets were being displayed but a user is then manipulating the Touch Mouse, then only the Tool Glass would be permitted to fade-out while the toolbars remained fully displayed. The specific decision process would be governed by the particular widgets that could be simultaneously displayed, a need to continue displaying one or more these widgets based on a current contextual setting of the application including an operation then being performed, and relative display prioritization among these widgets.

It should be understood that the present invention may employ other sensing technologies, apart from touch sensing, to invoke on-demand action, such as, e.g.: galvanic skin response, non-contact proximity sensors, pressure sensors, events from touch/proximity sensors on a keyboard, data from a GPS (global positioning system) receiver (position of the user or location of a mobile computer), video data from a camera, and audio data from a microphone.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

The invention claimed is:

1. In a computer system having an auxiliary control and a display screen, the auxiliary control being assigned a first function in a first application and a second function in a second application, a method comprising the steps of:
   detecting a physical presence proximate to or contacting the auxiliary control for a first predefined period without the physical presence causing a function assigned to the auxiliary control to be activated;
   in the first application program, displaying a first display widget on the display screen responsive to said step of detecting, the first display widget providing status information for the first function assigned to the auxiliary control in the first application program; and
   in the second application program different from the first application program, displaying a second display widget on the display screen responsive to said detecting, the second display widget providing status information for the second function assigned to the auxiliary control in the second application program.

2. The method according to claim 1, further comprising the steps of:
   detecting absence of the physical presence proximate to or contacting the auxiliary control for a second predefined period in which the auxiliary control has not been activated while displaying the first display widget; and
   discontinuing display of the first display widget, responsive to detecting the absence of the physical presence.

3. The method according to claim 1, wherein the auxiliary control is one of a button or a key.

4. The method according to claim 1, wherein the physical presence is a hand of a user.

5. The method according to claim 1, wherein the first display widget and the second display widget are different.

6. In a computer system having an auxiliary control and a display screen, the auxiliary control being assigned a multimedia function, a method comprising the steps of:
   detecting a physical presence proximate to or contacting the auxiliary control for a predefined period without the physical presence causing the multimedia function assigned to the auxiliary control to be activated; and
   displaying a display widget on the display screen responsive to said step of detecting, the display widget providing status information for the multimedia function assigned to the auxiliary control, the status information identifying at least one of track name, track time remaining, track length, album title and album length in a multimedia application.

7. The method according to claim 6, wherein said step of displaying further includes displaying a multimedia control panel.

8. In a computer system having an auxiliary control and a display screen, the auxiliary control being assigned a function of switching focus between currently running applications, a method comprising the steps of:
   while a first currently running application is in focus, detecting a physical presence proximate to or contacting the auxiliary control for a predefined period without the physical presence causing the function of switching focus to another currently running application assigned to the auxiliary control to be activated; and
   displaying a display widget on the display screen responsive to said step of detecting, the display widget providing status information for the function assigned to the auxiliary control, the status information identifying each of the currently running applications.

9. The method according to claim 8, further comprising the step of placing a second currently running application in the foreground of the display screen, responsive to a user activating the auxiliary control to switch focus to the second currently running application.

10. In a computer system having an auxiliary control and a display screen, the auxiliary control being assigned a function of showing a task bar, a method comprising the steps of:
    detecting a physical presence proximate to or contacting the auxiliary control for a predefined period without the physical presence causing the function of showing the task bar assigned to the auxiliary control to be activated; and
    displaying a display widget on the display screen responsive to said step of detecting, the display widget providing status information for the function of showing the task bar assigned to the auxiliary control, the status information including the task bar.

11. In a computer system having an auxiliary control and a display screen, the auxiliary control being assigned a first function in a first application and a second function in a second application, a method comprising the steps of:
    detecting a physical presence proximate to or contacting the auxiliary control for a predefined period without the physical presence causing a function assigned to the auxiliary control to be activated; and
    displaying a display widget on the display screen responsive to said step of detecting, the display widget providing status information for the function assigned to the auxiliary control, wherein a type of status information for the first function assigned to the auxiliary control displayed when a first application program is active is different from a type of status information for the second function assigned to the auxiliary control displayed when a second application program is active.

12. In a computer system having an auxiliary control and a display screen, the auxiliary control being assigned a messaging related function, a method comprising the steps of:

detecting a physical presence proximate to or contacting the auxiliary control for a predefined period without the physical presence causing the messaging related function on assigned to the auxiliary control to be activated; and displaying a display widget on the display screen responsive to said step of detecting, the display widget providing status information for the messaging related function assigned to the auxiliary control, wherein the status information includes one of the number of new or unread regular or high priority messages, an in box window, brief information regarding at least one of the most recently received messages, and alert status.

13. In a computer system having an auxiliary control and a display screen, the auxiliary control being assigned a web browsing function, a method comprising the steps of:

detecting a physical presence proximate to or contacting the auxiliary control for a predefined period without the physical presence causing the web browsing function assigned to the auxiliary control to be activated; and displaying a display widget on the display screen responsive to said step of detecting, the display widget providing status information for the web browsing function assigned to the auxiliary control, wherein the status information includes at least one of the most recently used searches, at least one of the most recently obtained search results, identification of previous and next web pages which may be visited, list of favorite web pages, and current page loading information.

14. In a computer system having an auxiliary control and a display screen, the auxiliary control being assigned a function of pasting contents of a clipboard, a method comprising the steps of:

detecting a physical presence proximate to or contacting the auxiliary control for a predefined period without the physical presence causing the function of pasting contents of the clipboard assigned to the auxiliary control to be activated; and displaying a display widget on the display screen responsive to said step of detecting, the display widget providing status information for the function of pasting contents of the clipboard assigned to the auxiliary control, wherein the status information identifies the contents of the clipboard.

15. In a computer system having an auxiliary control and a display screen, the auxiliary control being assigned a save function while in a document, a method comprising the steps of:

while in a document, detecting a physical presence proximate to or contacting the auxiliary control for a predefined period without the physical presence causing the save function assigned to the auxiliary control to be activated; and displaying a display widget on the display screen responsive to said step of detecting, the display widget providing status information for the save function assigned to the auxiliary control, wherein the status information identifies at least one of time, date, location, file type and size of most recently saved for the document.

16. In a computer system having an auxiliary control assigned a mathematical function in an application and a display screen, a method comprising the steps of:

receiving a selection of a range of cells in the applications;

while the cells are selected, detecting a physical presence proximate to or contacting the auxiliary control for a predefined period without the physical presence causing the mathematical function assigned to the auxiliary control to be activated; and displaying a display widget on the display screen responsive to said step of detecting, the display widget providing status information for the mathematical function assigned to the auxiliary control, wherein the status information identifies a result if the mathematical function would be applied to the selected cells.

* * * * *